(12) United States Patent
Rahman et al.

(10) Patent No.: US 10,228,064 B2
(45) Date of Patent: Mar. 12, 2019

(54) MULTI-PORTED REFRIGERATION VALVE ASSEMBLY

(71) Applicant: Parker-Hannifin Corporation, Cleveland, OH (US)

(72) Inventors: Anisur M. Rahman, Lake Villa, IL (US); Srinivasu Jalluri, Lombard, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/026,095

(22) Filed: Jul. 3, 2018

(65) Prior Publication Data

US 2018/0313451 A1 Nov. 1, 2018

Related U.S. Application Data

(62) Division of application No. 14/661,696, filed on Mar. 18, 2015, now Pat. No. 10,024,441.

(60) Provisional application No. 61/954,853, filed on Mar. 18, 2014.

(51) Int. Cl.
| | |
|---|---|
| *F16K 1/54* | (2006.01) |
| *F16K 11/22* | (2006.01) |
| *F25B 41/04* | (2006.01) |
| *F25B 41/06* | (2006.01) |

(52) U.S. Cl.
CPC ............... *F16K 1/54* (2013.01); *F16K 11/22* (2013.01); *F25B 41/04* (2013.01); *F25B 41/062* (2013.01); *F25B 2500/18* (2013.01); *Y10T 137/87708* (2015.04)

(58) Field of Classification Search
CPC ...... F16K 11/22; F16K 27/003; F25B 40/062; F25B 41/04
See application file for complete search history.

(56) References Cited

U.S. PATENT DOCUMENTS

| | | | |
|---|---|---|---|
| 5,685,164 | A | 11/1997 | Gardner |
| 5,832,956 | A | 11/1998 | Nimberger |
| 7,328,593 | B2 | 2/2008 | Wiwe et al. |
| 2005/0155376 | A1 | 7/2005 | Wiwe |
| 2005/0217313 | A1 | 10/2005 | Tsugawa |
| 2011/0120578 | A1 | 5/2011 | Lockhart |

OTHER PUBLICATIONS

"MVP Multi-Valve Platform", Hansen Technologies Corporation Catalog, Aug. 2012.

*Primary Examiner* — Elizabeth J Martin
(74) *Attorney, Agent, or Firm* — Renner, Otto, Boisselle & Sklar LLP

(57) ABSTRACT

A refrigeration valve having a valve body having an inlet, an outlet, and a flow passage defined therebetween, an expansion valve in the flow passage, a first hand valve between the inlet and the expansion valve, and a second hand valve between the outlet and the expansion valve. The first and second hand valves are provided at a top of the valve body and are movable in a first direction for preventing fluid flow through the flow passage. By providing the first and second hand valves at the top of the valve body rather than at a bottom of the valve body, valve life is increased and the valves are not prevented from operating due to particulate build up in the valves.

5 Claims, 22 Drawing Sheets

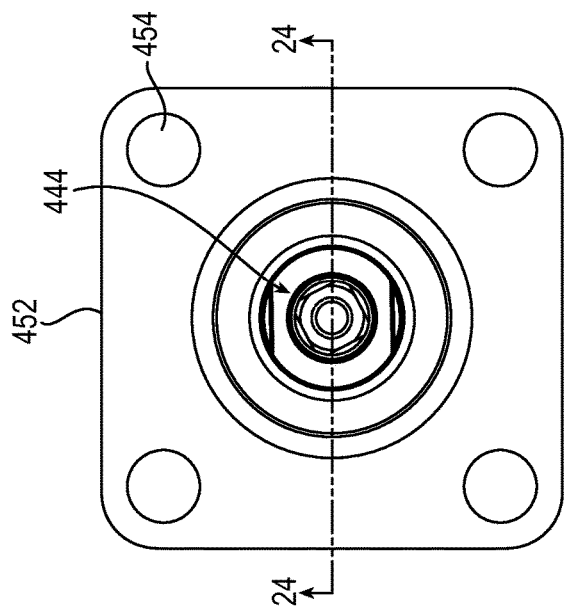
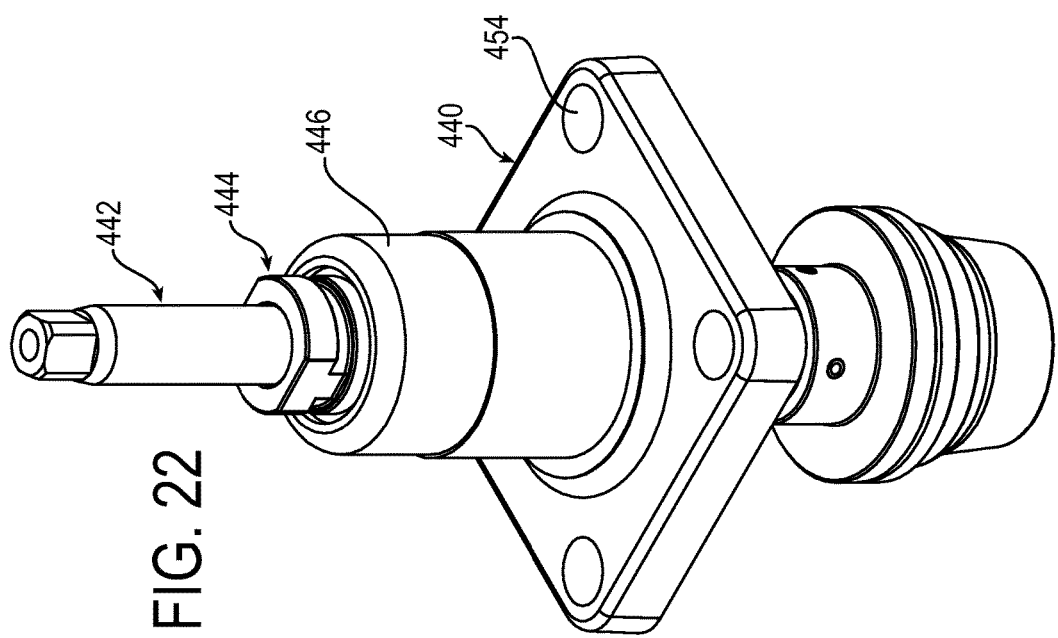

MULTI-PORTED REFRIGERATION VALVE ASSEMBLY

RELATED APPLICATION DATA

This application is a divisional of U.S. patent application Ser. No. 14/661,696 filed Mar. 18, 2015, which claims the benefit of U.S. Provisional Application No. 61/954,853 filed Mar. 18, 2014, both of which are hereby incorporated herein by reference.

FIELD OF INVENTION

The present invention relates generally to refrigeration valves, and more particularly to multi-ported refrigeration valves.

BACKGROUND

In a refrigeration system for use in commercial and industrial applications, a fluid such as ammonia or carbon dioxide is compressed by a compressor unit and discharged from a discharge side of the compressor. The compressed fluid, at high temperature and pressure, enters a condenser where heat is removed from the compressed fluid. The fluid then travels through an expansion valve that throttles the fluid as it flows through the valve, which causes the fluid to change phase from liquid to a saturated liquid/vapor mixture as it enters the evaporator. In the evaporator, heat is drawn from the environment to replace the latent heat of vaporization of the fluid, thus cooling the environmental air. The low pressure fluid flow from the evaporator returns to a suction side of the compressor to begin the cycle anew.

SUMMARY OF INVENTION

The present invention provides a refrigeration valve having a valve body having an inlet, an outlet, and a flow passage defined therebetween, an expansion valve in the flow passage, a first hand valve between the inlet and the expansion valve, and a second hand valve between the outlet and the expansion valve. The first and second hand valves are provided at a top of the valve body and are movable in a first direction for preventing fluid flow through the flow passage. By providing the first and second hand valves at the top of the valve body rather than at a bottom of the valve body, valve life is increased and the valves are not prevented from operating due to particulate build up in the valves.

According to one aspect of the invention, a refrigeration valve assembly is provided including a valve body having an inlet, an outlet, and a flow passage defined therebetween, an expansion valve in the flow passage for throttling fluid flowing through the flow passage, a first hand valve between the inlet and the expansion valve and movable in a first direction for preventing fluid flow from the inlet to the outlet, and a second hand valve between the outlet and the expansion valve and movable in the first direction for preventing fluid flow from the outlet to the inlet.

The valve assembly may further include a regulator valve between the first hand valve and the expansion valve.

The regulator valve may include a cartridge assembly having a cartridge body extending into the flow passage and being seated against a shoulder in the valve body, a piston disposed in the cartridge body and movable by a force acting on a backside of the piston, and a plug movable relative to the cartridge body by the piston to regulate the flow of fluid through the passage.

The cartridge body and plug may each include a plurality of windows through which fluid flows.

The piston may be movable by a manually operated plunger abutting the backside of the piston.

The piston may be movable by fluid from a solenoid valve acting on the backside of the piston.

The first and second hand valves may be received in the respective valve ports at a top of the valve body.

The first and second hand valves may each include a stem assembly movable in the first direction to seat against a respective valve seat in the body to prevent fluid flow through the flow passage.

The valve assembly may further include a strainer downstream of the first hand valve for filtering particulates from the fluid flowing through the flow passage.

The valve body may further include a strengthening rib extending along an outer wall of the valve body between the inlet and the outlet.

The strengthening rib may have disposed strategically along its length a plurality of ports extending into the flow passage that serve as drain ports and/or test ports.

The valve assembly may further include a check valve assembly for preventing fluid flow through the flow passage from the expansion valve to the inlet.

The valve assembly may further include a check valve cover that holds the check valve assembly into a shoulder of the valve body, wherein the check valve cover includes a plurality of windows through which fluid flows.

The flow passage may be an s-curve between the regulator valve and the check valve.

The expansion valve may include a stem and a plug coupled to the stem, wherein the stem and plug are movable in the first direction within the flow passage to throttle the fluid flowing through the flow passage.

The valve assembly may further include a seal cap coupled to at least one of the first hand valve, the second hand, or the expansion valve, wherein the seal cap prevents leaks from the respective valve to an environment.

Each seal cap may include a vent port for allowing fluid in the seal cap to be vented to the environment when the seal cap is uncoupled from the respective valve.

Each seal cap may include a spanner at the top of the seal cap that is configured to mate with a top of the of the respective valve stem when the seal cap is uncoupled from the valve stem to open and close the respective valve.

Each seal cap may include a plurality of grip portions for an operator to grip when opening and closing the respective valve.

According to another aspect of the invention, a refrigeration valve assembly is provided that includes a valve body having an inlet at a first end, an outlet at a second end, a flow passage defined between the inlet and outlet, and a strengthening rib extending between the inlet and the outlet, a flow control valve between the inlet and the outlet, and a hand valve between the inlet and the flow control valve for preventing fluid flow from the inlet to the outlet, wherein the strengthening rib has disposed strategically along its length a plurality of ports extending into the flow passage that serve as drain ports and/or test ports.

The flow control valve may be an expansion valve in the flow passage for throttling fluid flowing through the flow passage.

The flow control valve may be a regulator valve including a plug extending into the flow passage that is movable to regulate the flow of fluid through the flow passage.

The valve assembly may further include a hand valve between the outlet and the flow control valve for preventing fluid flow from the outlet to the inlet.

Each hand valve may be movable in a first direction for preventing fluid flow through the flow passage.

According to still another aspect of the invention, a multi-ported refrigeration valve assembly is provided that includes a valve body having an inlet, an outlet, and a flow passage defined therebetween, a first hand valve proximate the inlet for preventing fluid flow from the inlet to the outlet, a second hand valve proximate the outlet for preventing fluid flow from the outlet to the inlet, an expansion valve between the first hand valve and the second hand valve for throttling fluid flowing through the flow passage, and a regulator valve between the first hand valve and the expansion valve.

According to yet another aspect of the invention, a multi-ported refrigeration valve assembly is provided that includes a valve body having an inlet, an outlet, a flow passage defined between the inlet and the outlet and a plurality of valve ports, a first hand valve proximate the inlet, the first hand valve being received in one of the valve ports and having a stem assembly extending into the flow passage and being movable in a first direction to seat against a valve seat to prevent fluid flow from the inlet to the outlet, a second hand valve proximate the outlet, the second hand valve being received in one of the valve ports and having a stem assembly extending into the flow passage and being movable in the first direction to seat against a valve seat to prevent fluid flow from the outlet to the inlet, and an expansion valve received in one of the valve ports between the first hand valve and the second hand valve, the expansion valve having a stem assembly extending into the flow passage that is movable relative to a valve seat for throttling fluid flowing through the flow passage towards the outlet.

The multi-ported refrigeration valve assembly may further include a regulator valve received in one of the valve ports between the inlet and the expansion valve, the regulator including a plug extending into the flow passage that is movable to regulate the flow of fluid through the passage.

The foregoing and other features of the invention are hereinafter described in greater detail with reference to the accompanying drawings.

BRIEF DESCRIPTION OF THE DRAWINGS

FIG. 22 is a perspective view of an exemplary expansion valve.

FIG. 23 is a top view of the expansion valve.

DETAILED DESCRIPTION

Figure 1:
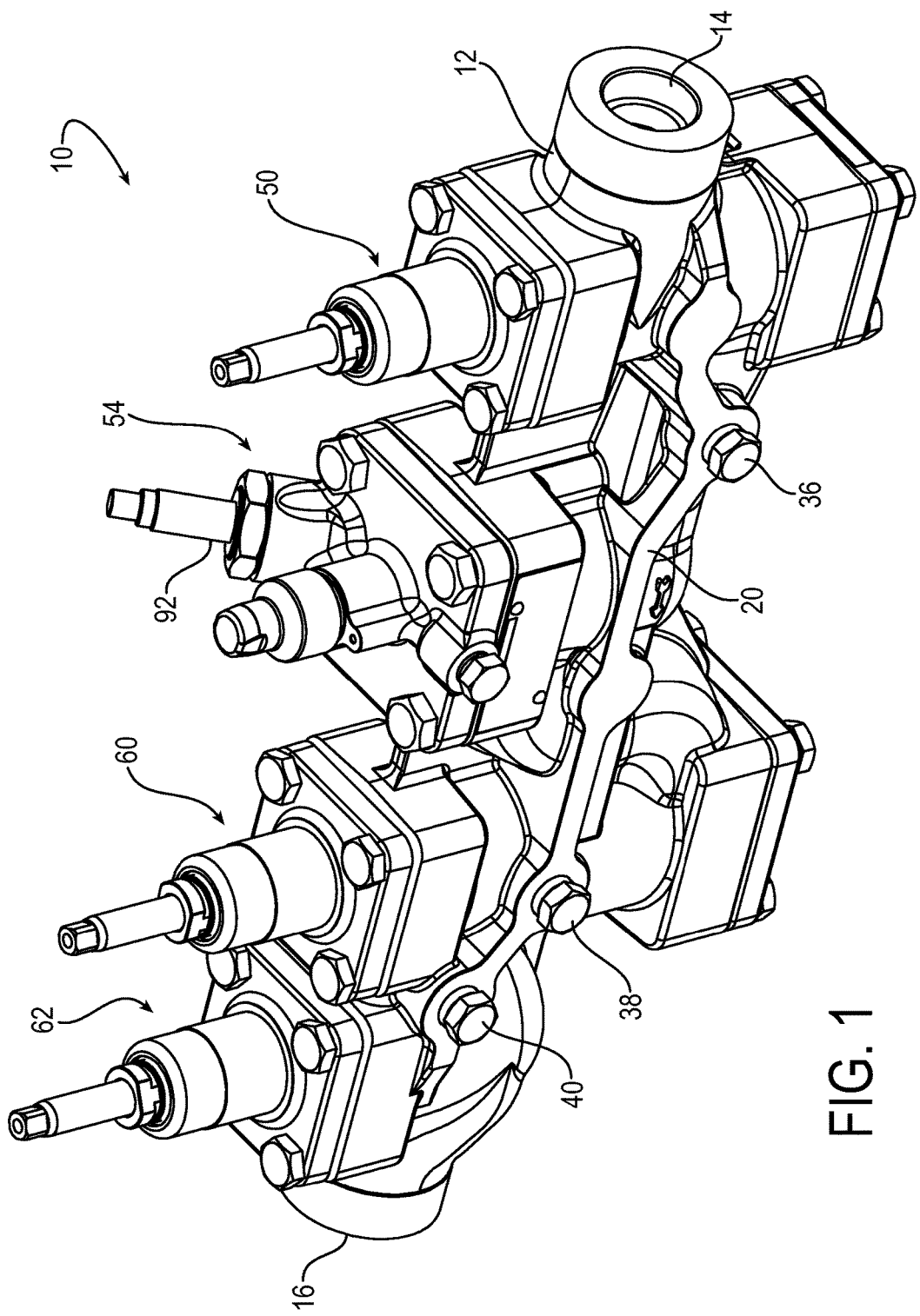
FIG. 1 is a perspective view of an exemplary multi-ported refrigeration valve assembly according to the invention.
Figure 2:
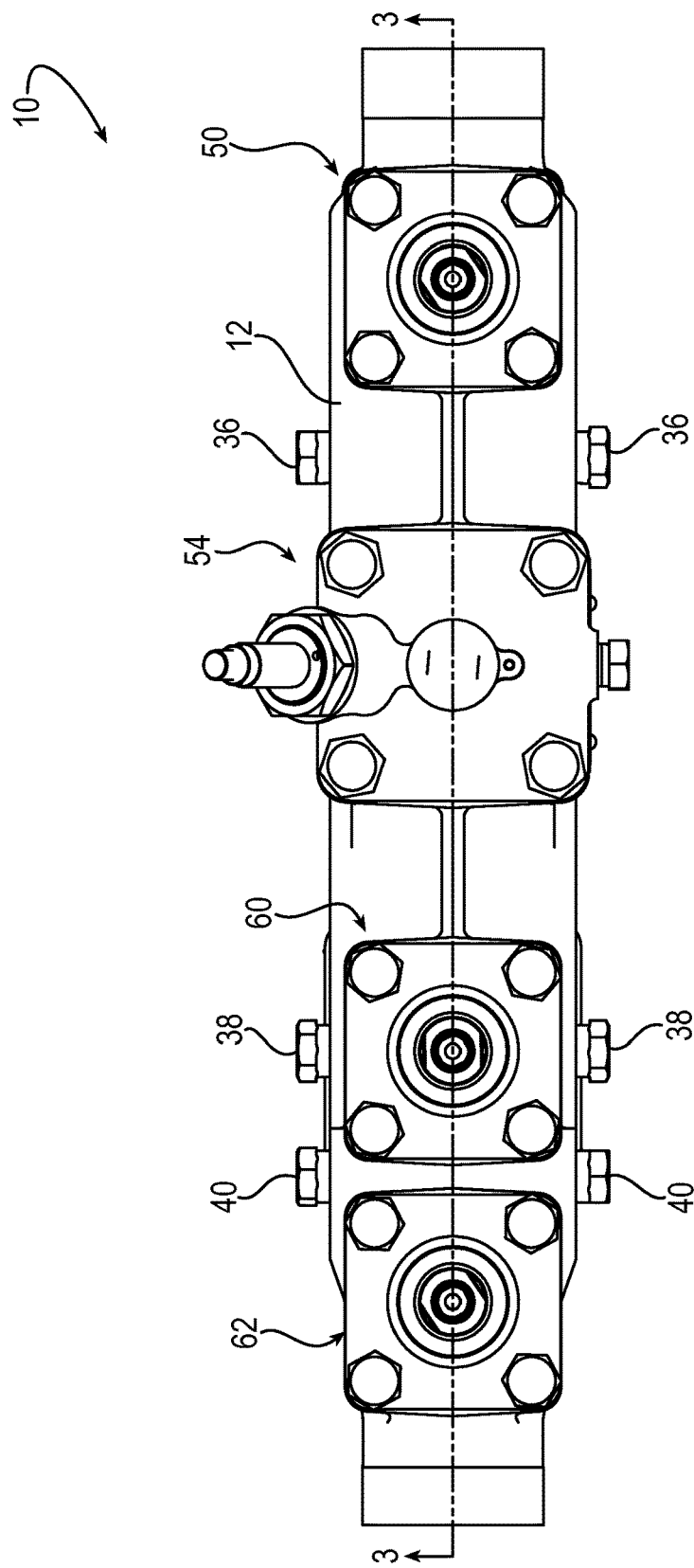
FIG. 2 is a top view of the multi-ported refrigeration valve assembly.

The principles of the present application have particular application to valve assemblies for use in commercial and industrial refrigeration systems, and thus will be described below chiefly in this context. It will of course be appreciated, and also understood, that the principles of the invention may be useful in other applications where control of fluid flow is desired.

Referring now in detail to the drawings, and initially to FIGS. 1-4, an exemplary multi-ported refrigeration valve assembly is designated generally at reference numeral 10. The valve assembly 10 may be secured in a pipeline (not shown) between pipes in a relatively permanent manner, such as by welding, making the valve assembly 10 an integral part of the system piping. Connecting the valve assembly 10 to the system piping in this manner reduces or eliminates the possibility of leakage between the valve assembly 10 and the piping and reduces the man hours for installation.

The multi-ported refrigeration valve 10 includes a valve body 12 having an inlet 14, and outlet 16, a flow passage 18 defined between the inlet 14 and outlet 16, a strengthening rib 20 extending along an outer wall of the valve body 12 between the inlet 14 and the outlet 16, and a plurality of valve ports 22, 24, 26 and 28 spaced along the length of the valve body 12. The flow passage 18 has a plurality of curved radii to minimize pressure drop of fluid flowing through the flow passage 18. The strengthening rib 20 provides a flat surface for welding and aligning the valve assembly 10, and provides rigidity to the valve body 12 against vibration and warping. The strengthening rib 20 has disposed strategically along its length a plurality of ports 30, 32, and 34 extending into the flow passage 18 that serve as drain ports and/or test ports, for example for receiving a pressure gauge. The strengthening rib 20 has a wall thickness allowing the ports 30, 32, and 34 to be tapped into the passage 18. The drain/test ports 30, 32, and 34 may be closed when not in use by drain plugs, such as hex plugs 36, 38, and 40 received in the ports 30, 32, and 34 respectively. It will be appreciated that a strengthening rib 20 may be provided on both sides of the valve body 12, and each rib has drain/test ports 30, 32, and 34 that may be closed by respective drain plugs 36, 38, and 40.

The multi-ported refrigeration valve also includes a first hand valve 50 received in the valve port 22, a strainer assembly 52, a control valve 54 received in the valve port 24, a check valve 56, a check valve support 58, an expansion valve 60 received in the valve port 26, and a second hand valve 62 received in the valve port 28. The valve ports 22, 24, 26 and 28, and consequently the valves 50, 54, 60 and 62, are provided at a top of the valve body 12 rather than at a bottom of the valve body 12 so that particulates do not collect in the valves 50, 54, 60, and 62. By preventing particulates from collecting in the valves and flow passage 18, valve life is increased and the valves are not prevented from operating as intended by particulates. The valve ports 22, 24, 26 and 28, and consequently the valves 50, 54, 60 and 62, are longitudinally spaced along the length of the valve body 12 to provide extra room for serviceability of the valves 50, 54, 60 and 62.

Figure 3:
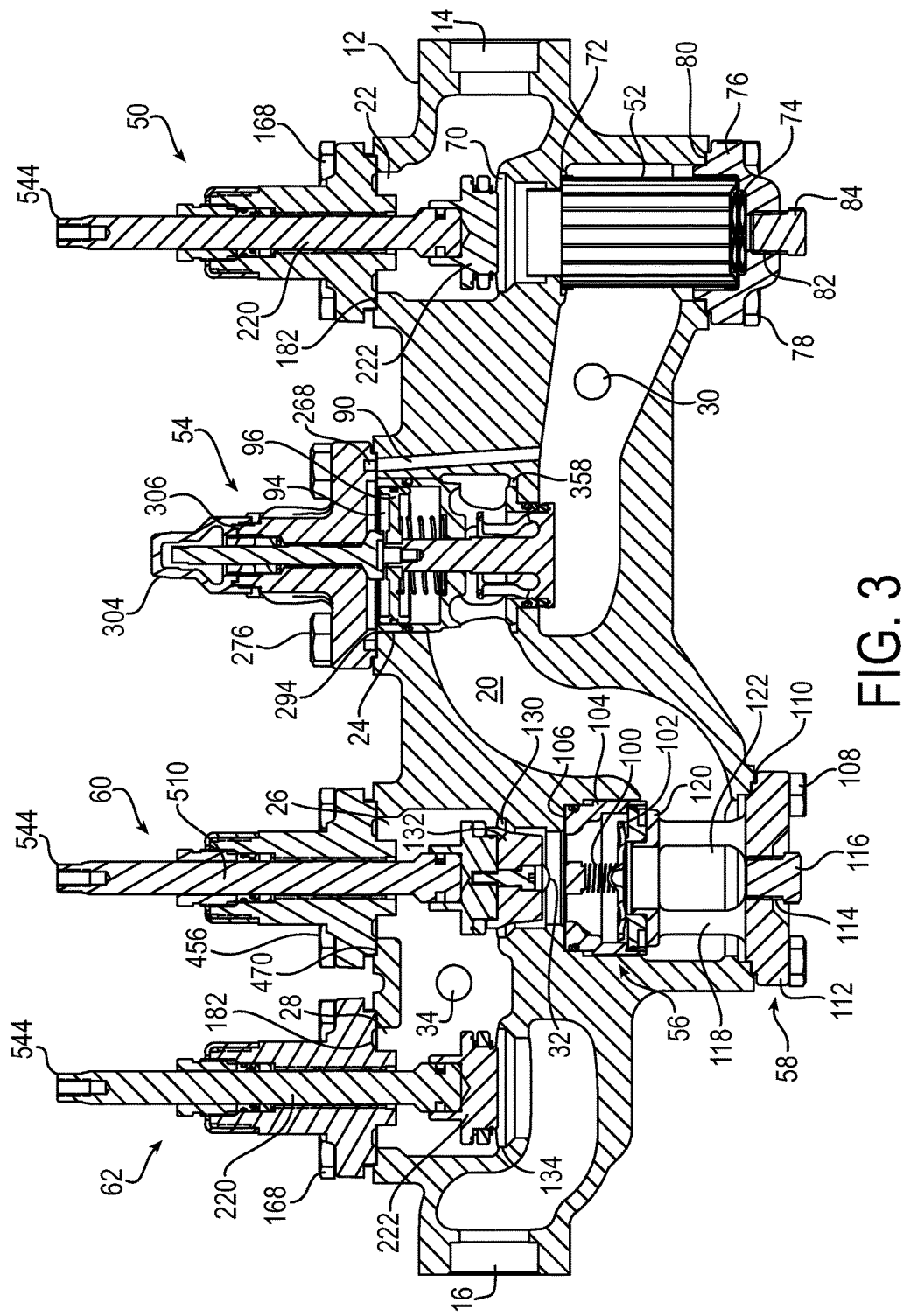
FIG. 3 is a cross-sectional view of the multi-ported refrigeration valve assembly taken about line 3-3 in FIG. 2.
Figure 4:
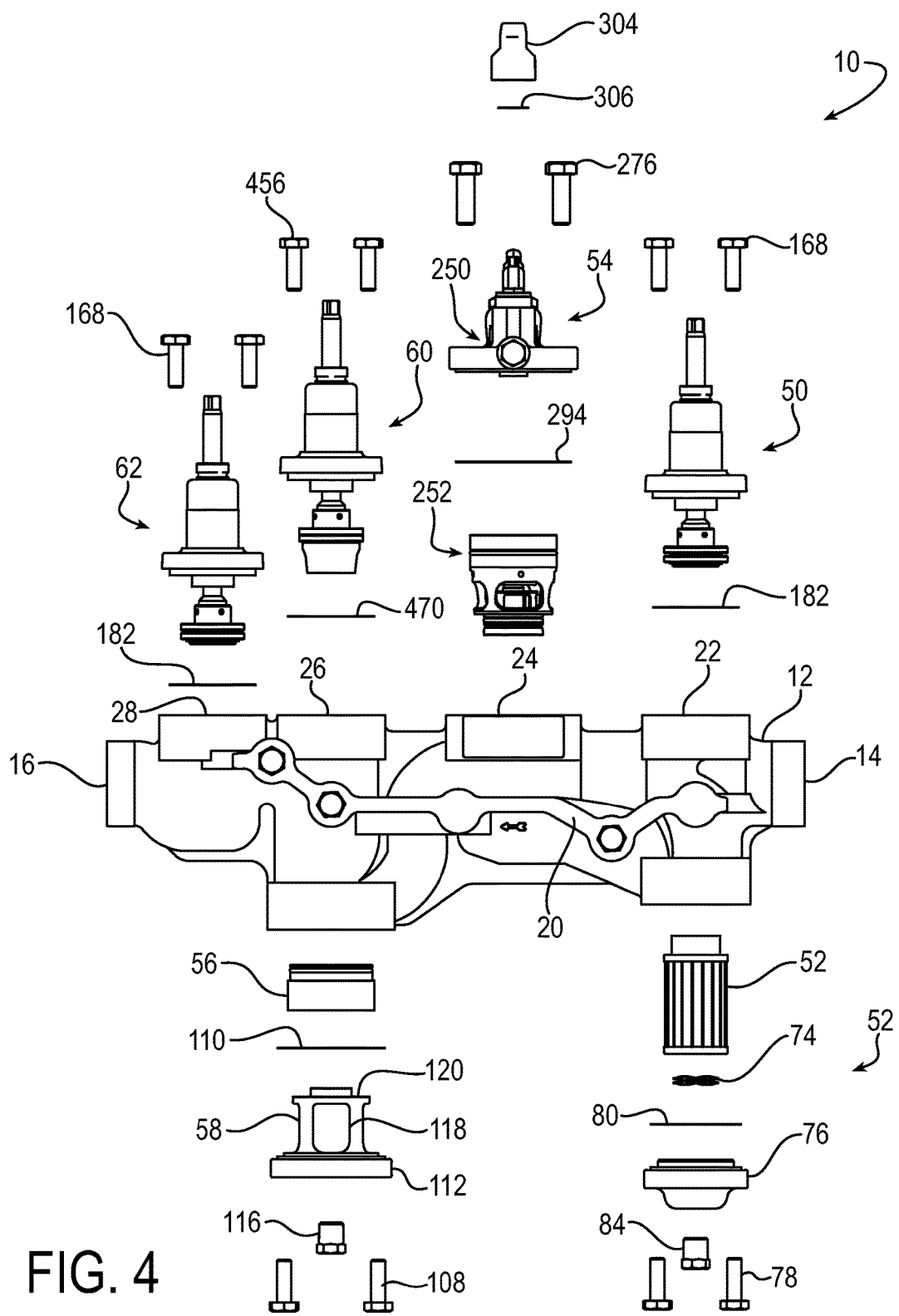
FIG. 4 is an exploded view of the multi-ported refrigeration valve assembly.
Figure 6:
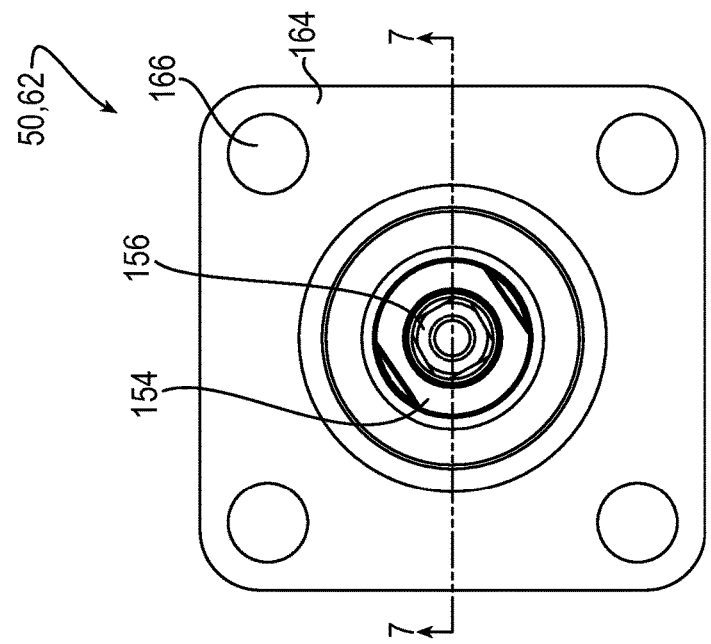
FIG. 6 is a top view of the hand valve.
Figure 5:
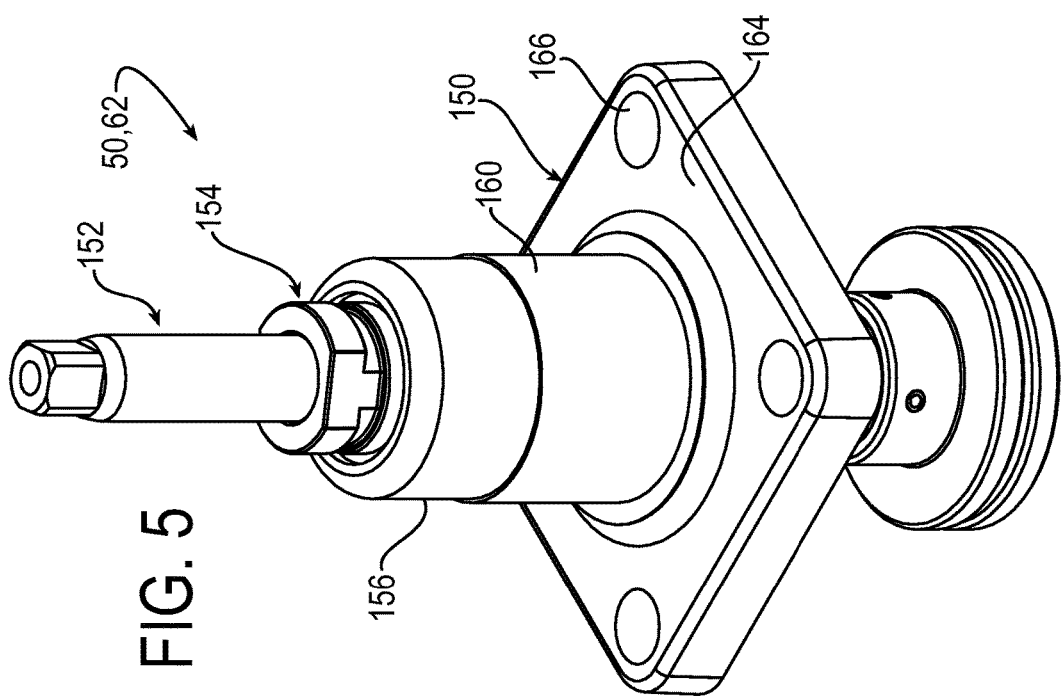
FIG. 5 is a perspective view of an exemplary hand valve.

Referring now to FIG. 3 in detail, fluid can enter the inlet 14 from the pipeline and flow through the flow passage 18 towards the hand valve 50 proximate the inlet 14. The hand valve 50 is movable in a first direction towards a valve seat 70 to a closed position to seat against the valve seat 70 to prevent fluid flow through the flow passage 18, and movable in a second direction opposite the first direction to an open position to unseat from the valve seat 70 to allow fluid flow through the flow passage 18 as shown in FIG. 3. When the hand valve 50 is in the open position, the fluid flows past the valve seat 70 and through the strainer 52 where particulates are removed from the fluid. The strainer 52 is biased against a shoulder 72 in the passage 18 by a resilient member 74, such as a wave spring, which prevents fluid from leaking past the strainer 52 as the fluid flows through the flow passage 18. The resilient member 74 has a first end seated against the strainer 52 and a second end seated against a cap 76 secured to the valve body 12. The cap 76 is secured to the valve body 12 in any suitable manner, such as by fasteners 78, and may be sealed to the valve body 12 in any suitable manner, such as by gasket 80. The cap 76 includes a drain 82 that may be plugged during operation by a drain plug 84, which may be secured to the cap 76 in any suitable manner, such as by a threaded connection.

The filtered fluid flows out of the strainer 52 and through the flow passage 18 towards the control valve 54. A portion of the fluid enters a passageway 90 in the valve body 12 upstream of the control valve 54, where the fluid flows into a pilot body 92 (FIG. 1) of the control valve 54 as will be discussed in detail below. A solenoid of the pilot body 92 may be activated causing the fluid to flow out of the pilot body 92 and act on a backside 94 of a piston 96 of the control valve 54 to move the piston 96 downward, thereby regulating the flow of fluid through the flow passage 18. Alternately, the solenoid may be replaced by a regulator, and if the pressure of the fluid overcomes a regulator pressure, the fluid flows out of the pilot body 92.

The fluid then flows through an s-curve portion of the flow passage 18, past the check valve support 58 and to the check valve 56. If the pressure of the fluid is high enough to overcome the spring force of a resilient member 100 the check valve 56, such as a spring, a flapper 102 of the check valve 56, which prevents fluid flow from the outlet 16 towards the inlet 14, is moved towards the spring 100 by the fluid. The fluid then flows through a body 104 of the check valve towards the expansion valve 60. The check valve 56 is held in position in the shoulder 106 in the flow passage 18 by the check valve support 58, which is coupled to the valve body 12 in any suitable manner, such as by fasteners 108, and which is sealed to the valve body 12 in any suitable manner, such as by gasket 110. The check valve support 58 includes a base 112 including a drain 114 that may be plugged during operation by a drain plug 116, a plurality of supports 118 extending upward from the base 112, and a flanged top portion 120 that abuts the check valve 56. The drain plug 116 may be secured to the base 112 in any suitable manner, such as by a threaded connection. The supports 118 are circumferentially spaced apart and define therebetween openings 122 for the fluid to flow past so that fluid may flow to the check valve no matter how the check valve support 58 is installed.

The fluid flowing towards the expansion valve 60 flows through a portion of the flow passage 18 formed by a valve seat 130. An expansion plug 132 of the expansion valve 60 is movable in the flow passage 18 relative to the valve seat 130 between a plurality of positions for throttling the fluid flowing through the flow passage 18 to expand the fluid from a single phase fluid to a two-phase liquid vapor. The expanded fluid then flows through the flow passage 18 towards the second hand valve 62. The second hand valve 62 is movable in the first direction towards a valve seat 134 to a closed position to seat against the valve seat 134 to prevent fluid flow through the flow passage 18, and movable in the second direction opposite the first direction to an open position to unseat from the valve seat 134 to allow fluid flow through the flow passage 18 as shown in FIG. 3. When the hand valve 62 is in the open position, the fluid flows past the valve seat 134 to the outlet 16, and then to the pipeline, where the two-phase fluid can be delivered to an evaporator.

The hand valves 50 and 62 allow the multi-ported refrigeration valve 10 to be closed for service, for example to service the expansion valve 60 or the strainer 52. When the hand valve 50 is closed, fluid is prevented from flow from the inlet 14 to the outlet 16, and is prevented from flowing from the flow passage 18 through the inlet 14 to the piping. Similarly, when the hand valve 62 is closed, fluid is prevented from flow from the outlet 16 towards the expansion valve 60, and is prevented from flowing from the flow passage 18 through the outlet 16 to the piping. After the hand valves 50 and 62 have been closed, the drain port 82 and/or drain port 114 may be removed to drain fluid trapped in the refrigeration valve 10. Additionally or alternatively, the drain plugs 36, 38, and/or 40 may be removed to drain fluid trapped in the refrigeration valve 10. By providing the longitudinally spaced valves 50, 54, 60 and 62, extra room is provided for an operator to service the valves or other components of the refrigeration valve 10. Additionally, by providing separate valves for shutting off flow, expansion, and flow control, the reliability of the separate valves is increased and it is easier for an operator to identify a problem and replace only the components that need servicing.

Turning now to FIGS. 5-9 in addition to FIG. 3, the first and second hand valves 50 and 62 will be described in detail. The first and second hand valves 50 and 62 substantially the same, and thus the same reference numerals are used to denote structures corresponding to similar structures in the hand valves 50 and 62. The first hand valve 50 is received in the first valve port 22 proximate the inlet 14 between the inlet 14 and the control and expansion valves 54 and 60, and the second hand valve 62 is received in the valve port 28 proximate the outlet 16 between the outlet 16 and the expansion valve 60.

Each hand valve 50, 62 includes a bonnet 150 coupled to the valve body 12, a stem assembly 152 movable in the first and second directions relative to the bonnet 150, a packing nut assembly 154 for sealing the stem assembly 152 to the bonnet 150, and a cover 156 coupled to the bonnet 150 for protecting threads 170, for example during transit. The bonnet 150 includes a collar 160, such as a cylindrical body having a passage 162 extending therethrough, and a flange portion 164 having a plurality of openings 166 for receiving suitable fasteners 168 to couple the hand valves 50 and 62 to the valve body 12. The collar 160 includes the threads 170 on an outer portion thereof for mating with threads 542 of seal cap 540 (FIG. 28), threads 174 in the passage 162 for mating with threads 176 on the packing nut assembly 154, and threads 178 in the passage 162 for mating with threads 180 on the stem assembly 152. When the collar 160 is coupled to the valve body 12, a suitable seal 182 may be provided to seal the bonnet 150 to the valve body 12.

The packing nut assembly 154 includes a packing nut 190 having the threads 176 for mating with the threads 174 in the passage 162 to secure the packing to the bonnet 150, a gland assembly 192, a stem packing 194, and first and second washers 196 and 198 on either side of the stem packing 194. The first washer 196 is positioned in the passage 162 and abuts a shoulder 200 in the passage 162, the stem packing 194 is positioned above the first washer 196, and the second washer 198 is positioned above the stem packing 194. The gland assembly 192 is provided above the second washer 198 and includes a gland 202 and first and second seals, such as o-rings 204 and 206 provided in respective seal grooves 208 and 210 in the gland 202. The first seal groove 208 is provided in an outer wall of the gland 202 for the o-ring 204 to seal the gland 202 to the passage 162, and the second seal groove 210 is provided in an inner wall of the gland 202 for the o-ring 206 to seal the gland 202 to the stem assembly 152 and the second washer 198. The packing nut 190 is then threaded into the passage 162 until a bottom portion of the packing nut 190 abuts a top portion of the gland 202.

Figure 7:
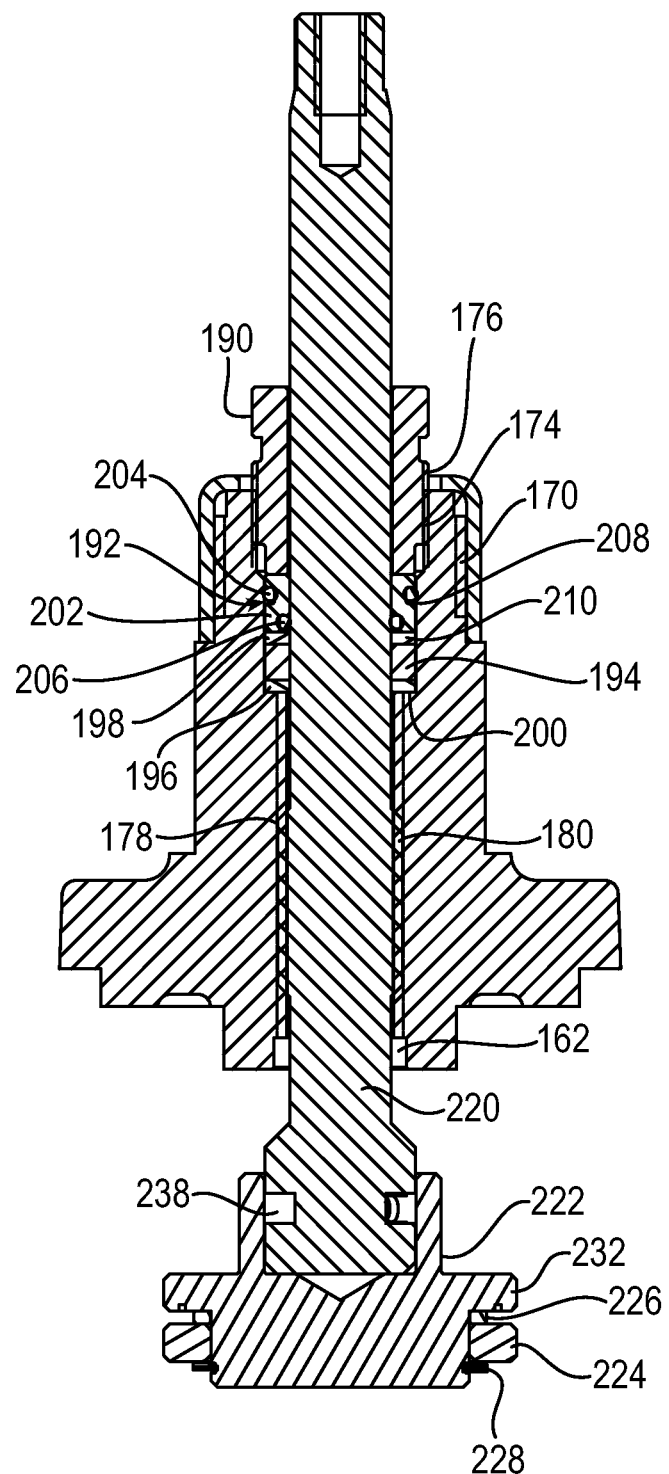
FIG. 7 is a cross-sectional view of the hand valve taken about line 7-7 in FIG. 6.
Figure 8:
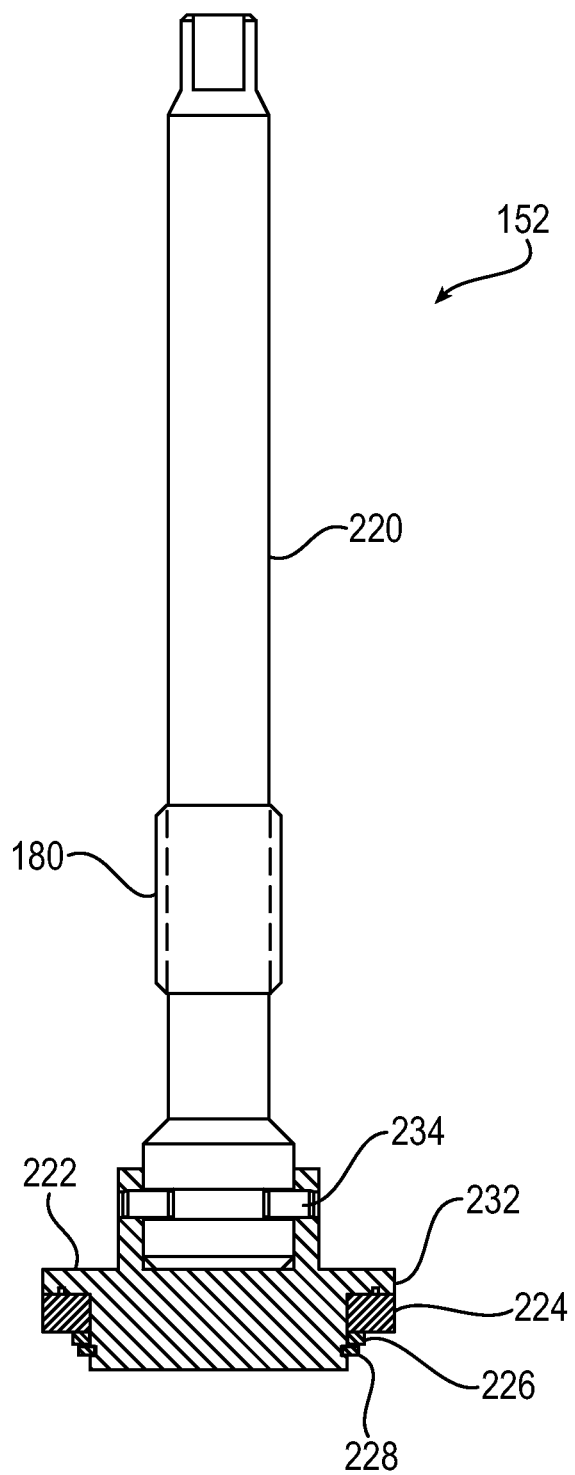
FIG. 8 is a cross-sectional view of a stem assembly of the hand valve.
Figure 9:
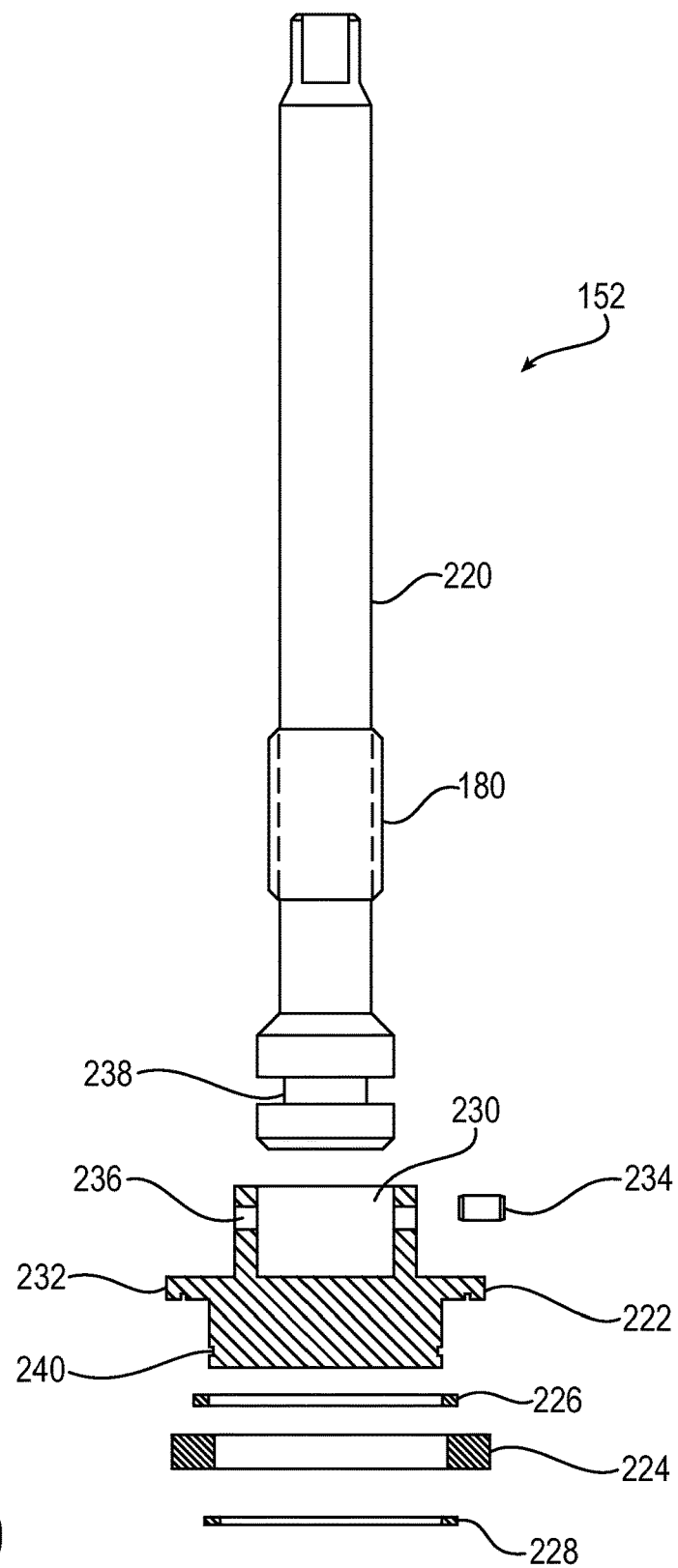
FIG. 9 is an exploded cross-sectional view of the stem assembly.
Figure 10:
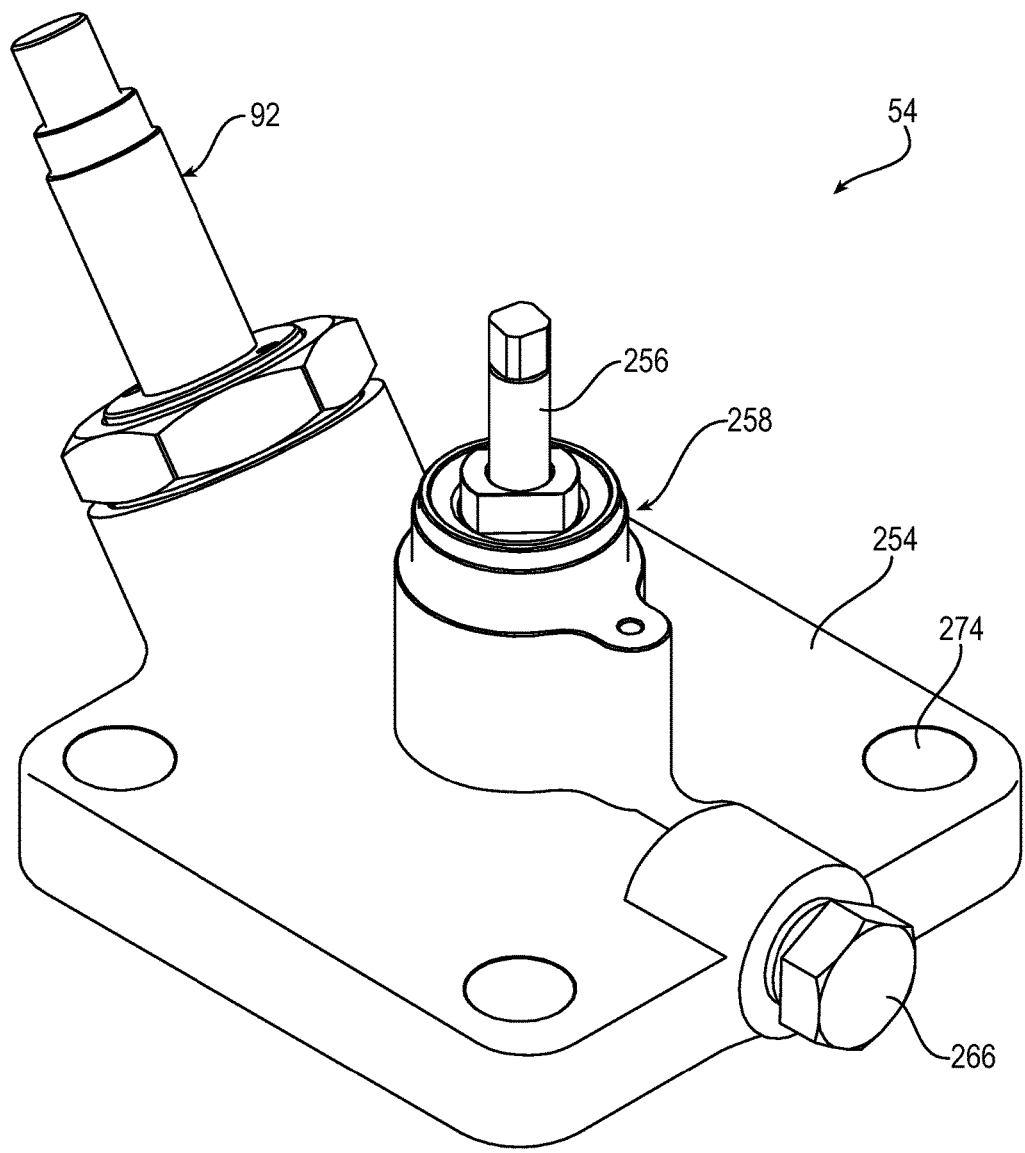
FIG. 10 is a perspective view of an exemplary port plate assembly.
Figure 11:
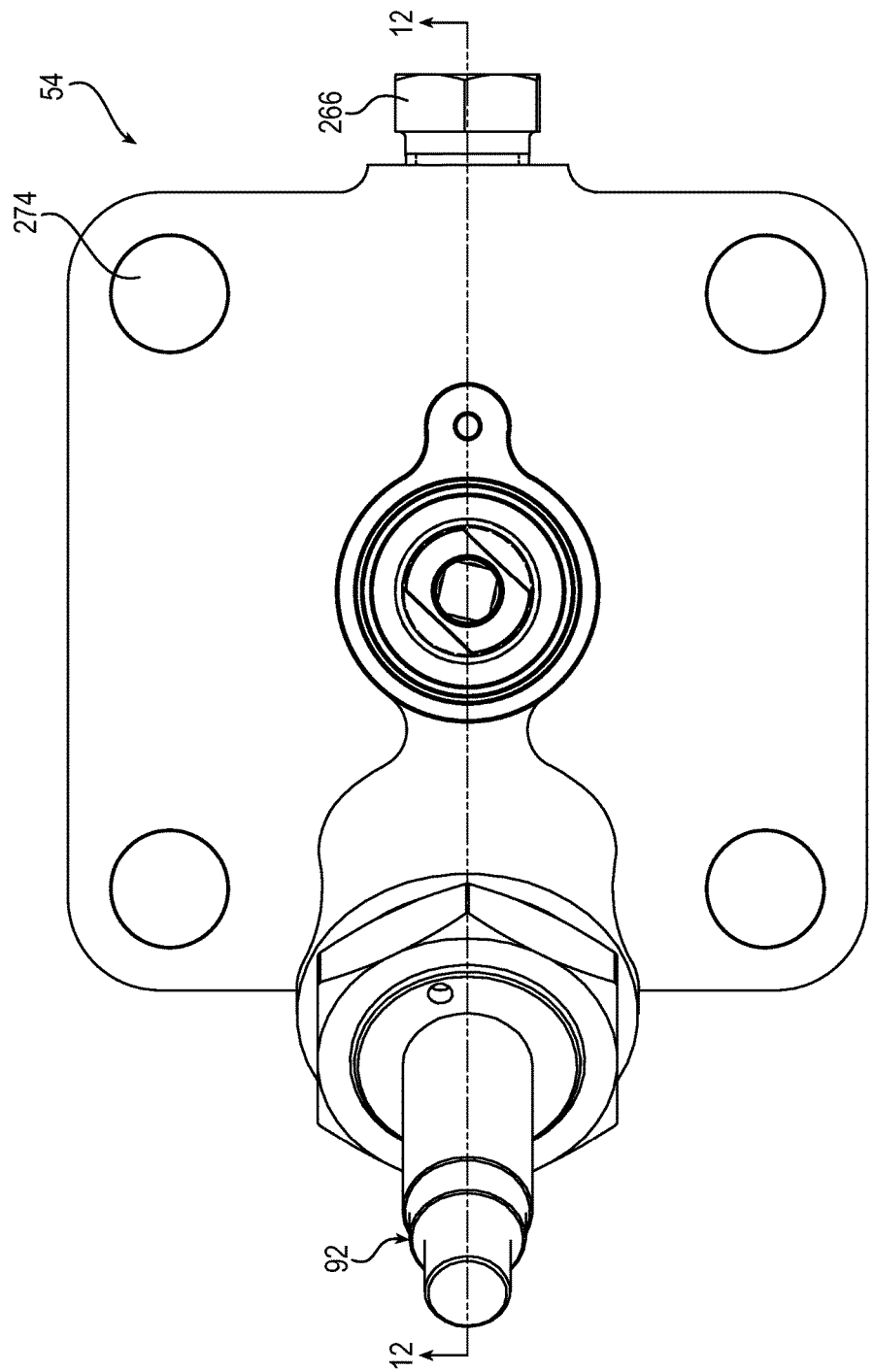
FIG. 11 is a top view of the port plate assembly
Figure 12:
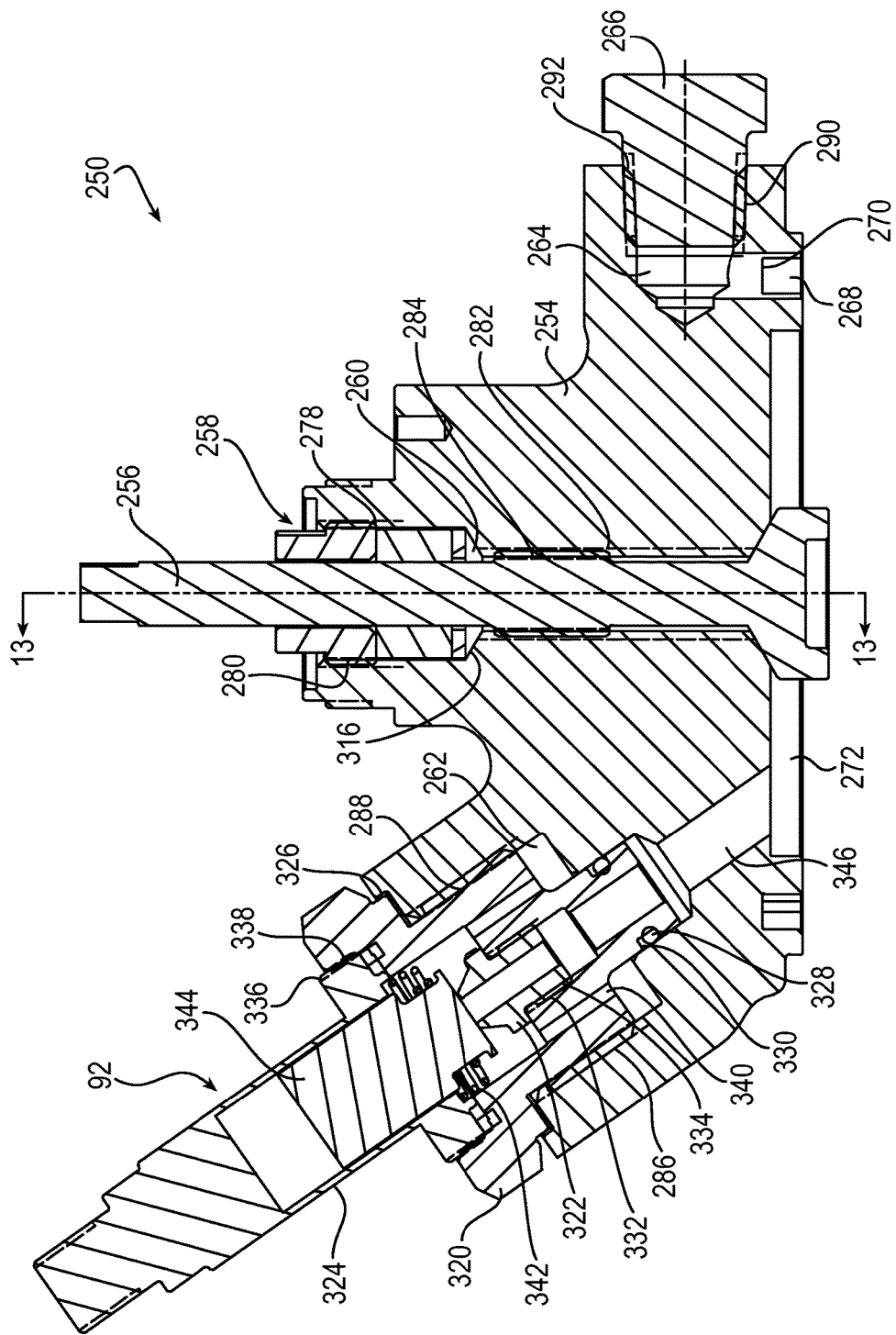
FIG. 12 is a cross-sectional view of the port plate assembly taken about line 12-12 in FIG. 11.
Figure 13:
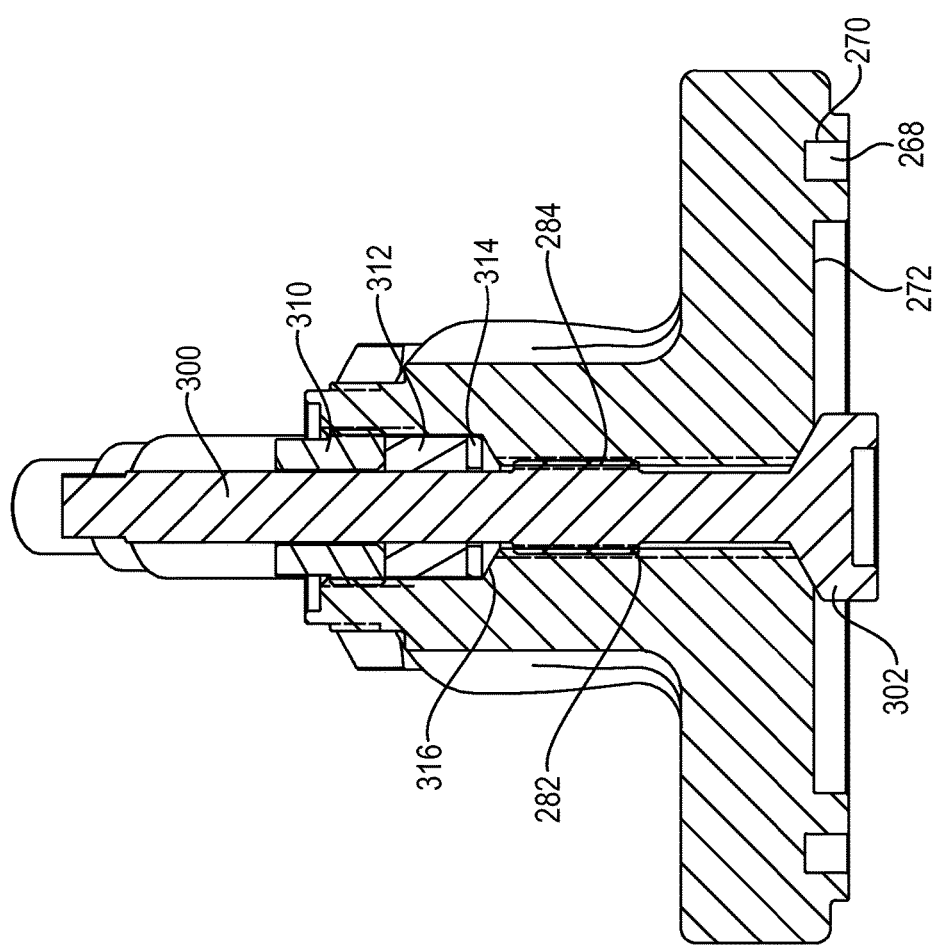
FIG. 13 is a cross-sectional view of the port plate assembly taken about line 13-13 in FIG. 12.
Figure 14:
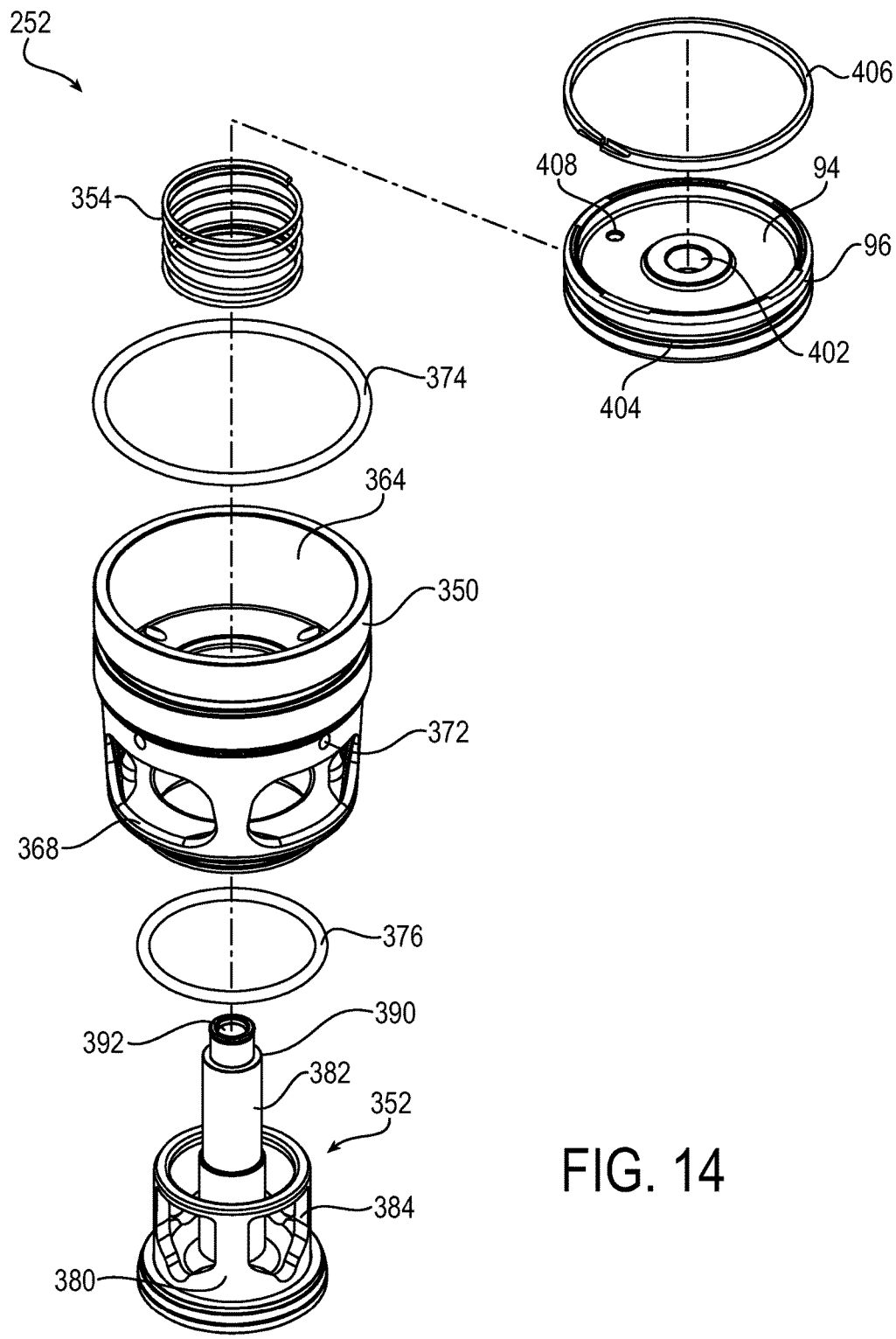
FIG. 14 is an exploded view of an exemplary cartridge assembly.
Figure 15:
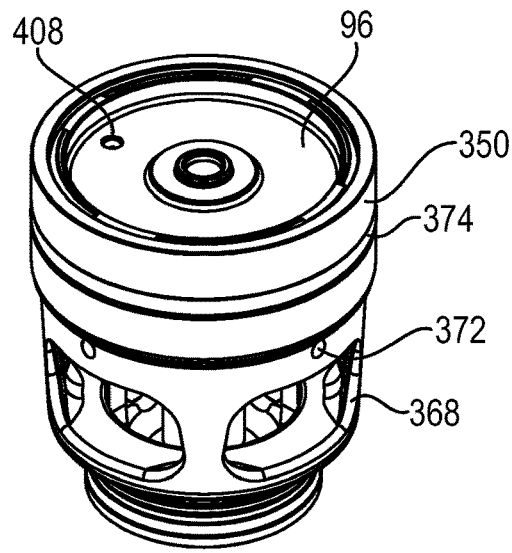
FIG. 15 is a perspective view of the cartridge assembly.
Figure 16:
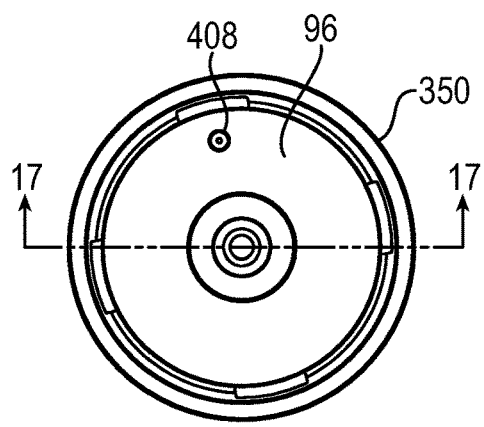
FIG. 16 is a top view of the cartridge assembly
Figure 17:
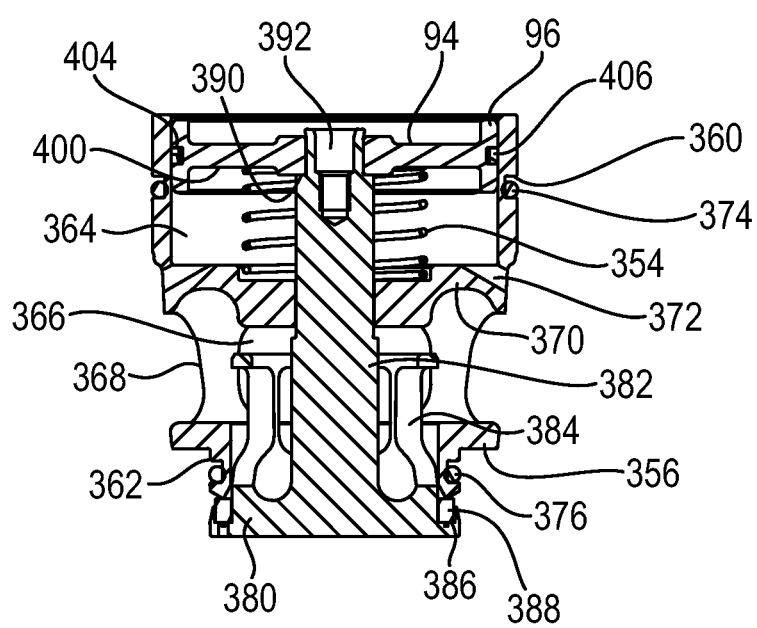
FIG. 17 is a cross-sectional view of the cartridge assembly taken about line 17-17 in FIG. 16.
Figure 18:
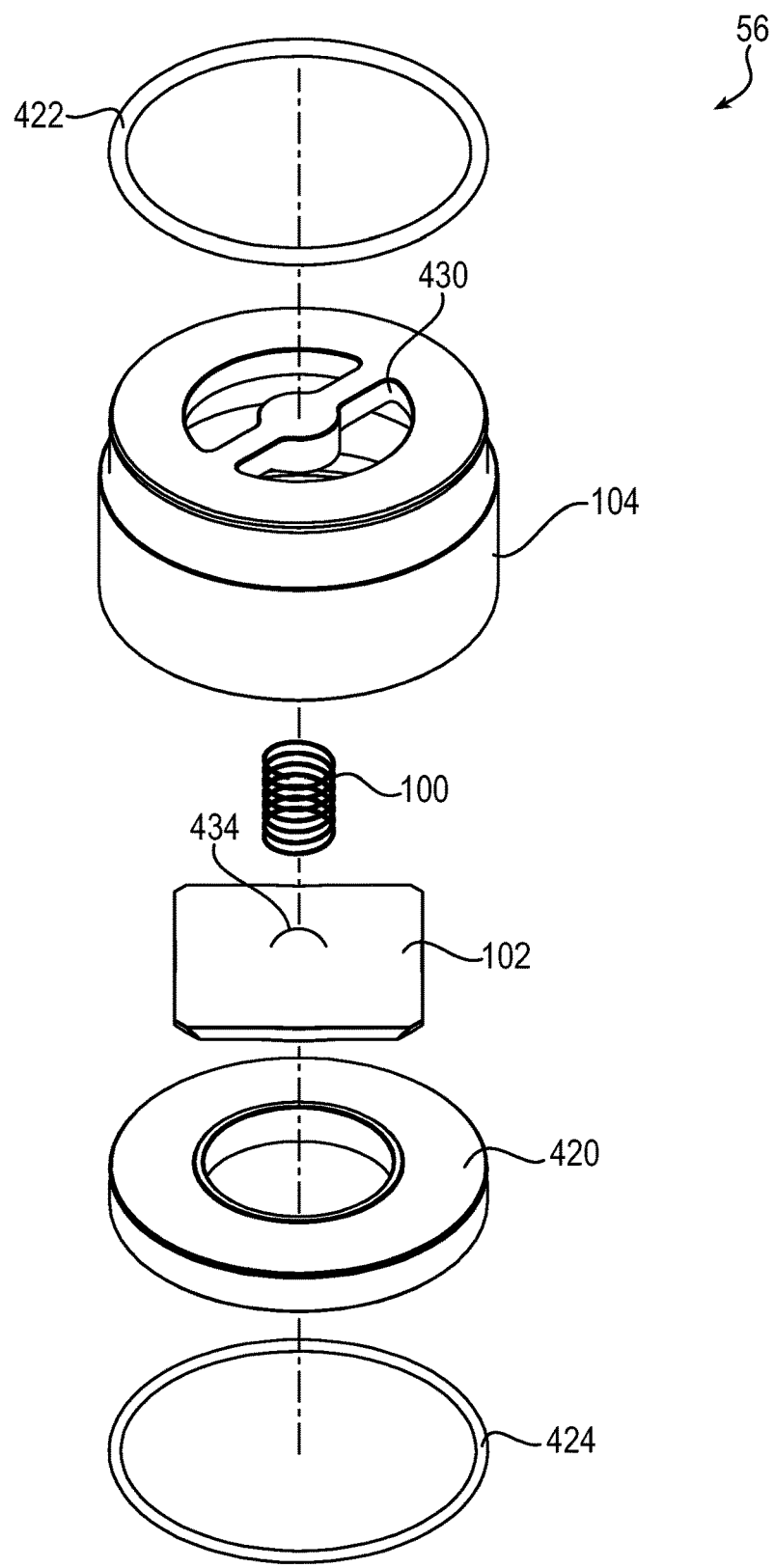
FIG. 18 is an exploded view of an exemplary check valve assembly.
Figure 19:
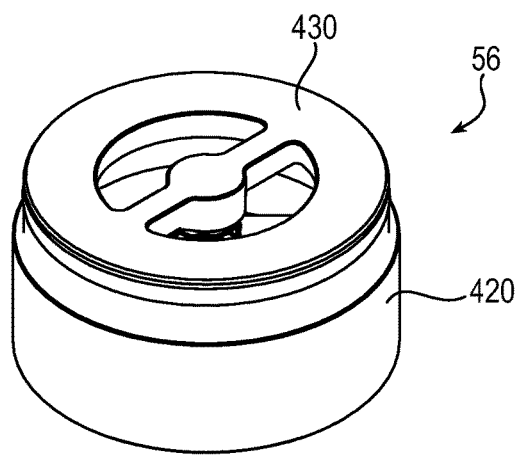
FIG. 19 is a perspective view of the check valve assembly.
Figure 20:
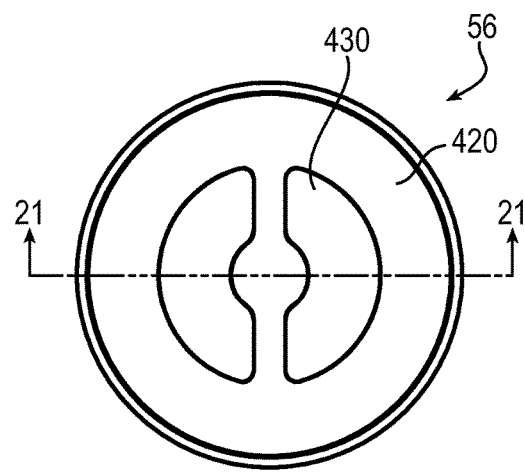
FIG. 20 is a top view of the check valve assembly.
Figure 21:
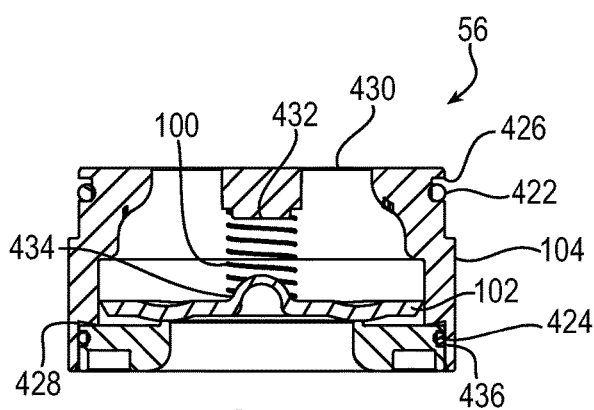
FIG. 21 is a cross-sectional view of the check valve assembly taken about line 21-21 in FIG. 20.

Referring now to FIGS. 7-9, the stem assembly 152 includes a stem 220 having the threads 180 for mating with the threads 178 in the passage 162, a seat disc 222, a disc carrier 224, a retaining washer 226, and a retainer ring 228. The seat disc 222 includes a cavity 230 for receiving an end of the stem 220 and a flange portion 232. The stem 220 is secured in the cavity 230 by a plurality of spring pins 234 that extend through slots 236 extending through the seat disc 222 into the passage 230 and into an annular groove 238 in the stem 220. The disc carrier 224 abuts a bottom of the flange portion 232 and is secured to the seat disc 222 by the retaining washer 226 and retaining ring 228. The retaining washer 226 is shown in FIG. 8 having one side abutting the disc carrier 224 and another side abutting the retaining ring 228, which is secured in a ring groove 240 in the disc carrier 222. Alternatively, the retaining washer 226 is shown in FIG. 7 having one side abutting the flange 232 and another side abutting one side the disc carrier 224, and the disc carrier 224 has another side abutting the retaining ring 228, which is secured in the ring groove 240.

When the hand valve 50 is secured to the valve body 12, the stem 220 may be moved in the first direction to the closed position to seat the disc carrier 224 against the valve seat 70 to prevent fluid flow through the flow passage 18, and the stem 220 may be moved in the second direction to the open position to unseat the disc carrier 224 from the valve seat 70 to allow fluid flow through the passage 18. Similarly, when the hand valve 62 is secured to the valve body 12, the stem 220 may be moved in the first direction to the closed position to seat the disc carrier 224 against the valve seat 134 to prevent fluid flow through the flow passage 18, and the stem 220 may be moved in the second direction to the open position to unseat the disc carrier 224 from the valve seat 134 to allow fluid flow through the passage 18.

The hand valves 50 and 62 are moved by rotating the respective stem 220, for example by using a respective seal cap 540 (FIG. 27) described in detail below, which causes the threads 178 to move in the threads 180. In this way, an operator may rotate the stems 220 a predetermined number of turns to close the hand valves 50 and 62, and rotate the stems 220 the predetermined number of turns to open the hand valves 50 and 62. As noted above, by providing the hand valves 50 and 62 at the top of the valve body 12, particulates do not get caught in the hand valves 50 and 62 preventing them from operating, and therefore the hand valves 50 and 62 may open and close when the stems 220 are rotated.

Turning now to FIGS. 10-17 in addition to FIG. 3, the control valve 54 will be described in detail. The control valve or regulator valve 54 is received in the valve port 24 between the first hand valve 50 and the expansion valve 60. The control valve 54 includes a port plate assembly 250 shown in FIGS. 10-13 and a cartridge assembly 252 shown in FIGS. 14-17.

Referring now to FIGS. 10-13, the port plate assembly 250 includes a port plate 254 coupled to the valve body 12, a stem 256 movable in the first and second directions relative to the port plate 254 to manually control the cartridge assembly 252, a packing nut assembly 258 for sealing the stem 256 to the port plate 254, and the pilot body or regulator 92 coupled to the port plate 254 for controlling the cartridge assembly 252. The port plate 254 includes a first port 260 for receiving the stem 256 and packing nut assembly 258, a second port 262 for receiving the pilot body 92, a third port 264 for receiving a gauge/test plug 266, an annular passageway 268 formed between an annular groove 270 in the port plate 254 and the valve body 12 for receiving fluid from the passageway 90, a fluid chamber 272 at a bottom of the port plate 254 radially inwardly spaced from the passageway 268, and a plurality of openings 274 for receiving suitable fasteners 276 to couple to control valve 60 to the valve body 12. The first port 260 includes threads 278 for mating with threads 280 on the packing and threads 282 for mating with threads 284 on the stem 256, the second port 262 includes threads 286 for mating with threads 288 on an adapter of the pilot body 92, and the third port 264 includes threads 290 for mating with threads 292 on the gauge/test plug 266. When the gauge/test plug 266 is removed from the third port 264, fluid in the annular passageway 268 may be drained. When the port plate 254 is coupled to the valve body 12, a suitable seal 294 may be provided to seal the port plate 254 to the valve body 12.

The stem 256 includes an elongated body 300 surrounded by the packing nut assembly 258 having the threads 284 for mating with the threads 282 in the first port 260, and a plunger 302 at an end of the body 300 for contact the backside 94 of the piston 96. The stem 256 may be covered by a cap 304 that couples to the port plate 254 in any suitable manner, and the cap 304 may be sealed to the port plate 254 in any suitable manner, such as by seal 306. When the control valve 54 is operated manually, the stem 256 may be moved in the first direction to allow for flow through the cartridge assembly 252 and in the second direction to prevent flow through the cartridge assembly 252. The stem 256 is moved by rotating the stem 220, which causes the threads 284 to move in the threads 282. In this way, an operator may rotate the stems 256 a predetermined number of turns to open and close the cartridge assembly 252.

The packing nut assembly 258 includes a packing nut 310 having the threads 280 for mating with the threads 278 in the first port 260 to secure the packing nut assembly 258 to the port plate 254, a stem packing 312, and a washer 314. The washer 314 is positioned in the port 260 and abuts a shoulder 316 in the first port 260, and the stem packing 312 is positioned above washer 314. The packing nut 310 is then threaded into the port 260 until a bottom portion of the packing nut 310 abuts a top portion of the stem packing 312.

The pilot body 92 includes an adapter 320 having the threads 288 for mating with the threads 286 in the second port 262, a solenoid seat 322 received in the adapter 320, and a solenoid 324 received in the adapter 320 and abutting the solenoid seat 322. The solenoid 324 may be activated or deactivated for controlling whether the valve 54 is open or closed. The adapter 320 is sealed to the port plate 254 in any suitable manner, such as by gasket 326, and the adapter is sealed in the port 262 in any suitable manner, such as by o-ring 328 received in seal groove 330 of the adapter 320. The solenoid seat 322 has threads 332 that mate with threads 334 in the adapter 320, and the regulator 324 has threads 336 that mate with threads 338 in the adapter 320.

When the control valve 54 is coupled to the valve body 12, fluid flows through the flow passage 18 to the passageway 90 and into the annular passageway 268. The annular passageway 268 has an opening (not shown) associated therewith allowing fluid flow underneath the pilot body 92. The fluid flows from the opening into a flow passage 340 formed in the second port 262 and in the adapter 320. When the solenoid is activated, the a plunger 344 moves against a spring 342 biasing the plunger 344 against the solenoid seat 322, thereby allowing fluid to flow from the flow passage 340 through the solenoid seat 322 and the adapter 320 to a flow passage 346 in the port plate 254. The fluid then flows to the fluid chamber 272 where the fluid acts on the backside 94 of the piston 94.

Alternatively, the pilot body may be provided for setting a regulator pressure of the valve 54 for controlling whether the valve 54 is open or closed. In this embodiment, fluid in the flow passage 340 upon overcoming a regulator pressure of the regulator, for example by overcoming a spring force of the spring 342 biasing a plunger 344 of the regulator against the solenoid seat 322, the fluid flows through the solenoid seat 322 and the adapter 320 to the flow passage 346 in the port plate 254, and then to the fluid chamber 272 where the fluid acts on the backside 94 of the piston 94.

Referring now to FIGS. 14-17, the cartridge assembly 252 will be discussed in detail. The cartridge assembly 252 includes a cartridge body 350, a valve plug 352, a resilient member 354, and the piston 96. The cartridge body 350 includes a shoulder 356 that engages a valve seat 358 in the flow passage 18, first and second radially outwardly opening seal grooves 360 and 362, a piston chamber 364, a plug chamber 366, and circumferentially spaced windows 368 through which fluid flows from the plug chamber 366. The cartridge body 350 also includes a shelf 370 between the piston chamber 364 and plug chamber 366 and a plurality of relief holes 372 in the shelf 370 extending from the piston chamber 364 to an outer wall of the cartridge body 350. The first and second radially outwardly opening seal grooves 360 and 362 are configured to receive suitable seals, such as o-rings 374 and 376 respectively, to seal the cartridge body 350 to the valve body 12.

The valve plug 352 includes a plug body 380 and a stem 382 projecting upward from the plug body 380. The plug body 380 includes a plurality of circumferentially spaced windows 384 through which fluid flows and a flange portion 386 for receiving a ring seal 388 to seal the plug body 380 to a bottom of cartridge body 350 when seated against the bottom of the cartridge body 350. The stem 382 includes a shoulder 390 that abuts the piston 96 and a threaded portion 392 for receiving a tool, such as a bolt, to axially remove the cartridge assembly 252 from the valve body 12.

The piston 96 is received in the piston chamber 364 and movable in the piston chamber 364 against the resilient member 354, which is seated against a front side 400 of the piston 96 and the shelf 370. The piston 96 is movable by the plunger 302 during manual operation or by fluid from the flow passage 346 in the fluid chamber 272 acting on the back side 94 of the piston 96. The piston 96 includes a through passage 402 through which the stem 382 of the valve plug 352 extends, and the front side 400 of the piston 96 is seated on the shoulder 390 of the stem 382 so that movement of the piston 96 in the first direction effects movement of the valve plug 352 in the first direction. The piston 96 also includes a radially outwardly opening seal groove 404 for receiving piston ring 406 to seal the piston 96 in the piston chamber 364 against an inner wall of the cartridge body 350, and a regulation hole 408 for regulating fluid pressure between volumes above and below the piston 96.

During operation of the refrigeration valve 10, fluid flows through the flow passage 18 towards the control valve 54. The fluid enters the passageway 90 and flows to the pilot body 92, and upon overcoming the regulator pressure of the regulator 324, the fluid flows through the solenoid seat 322 and the adapter 320 to a flow passage 346 in the port plate 254, and then to the fluid chamber 272 where the fluid acts on the backside 94 of the piston 96. If the pressure of the fluid acting on the backside 94 of the piston 96 is high enough to overcome the force of the resilient member 368, the piston 96 is moved in the first direction towards the valve seat 358. The piston 96 thereby moves the valve plug 352 in the first direction away from the cartridge body 350 to unseat the ring seal 388 in the plug body 380 from the bottom of the cartridge body 350. Fluid then flows through the windows 384 into the plug chamber 366 in the cartridge body 350, and then through the windows 368 in the cartridge body 350 into the s-curve portion of the flow passage 18. If the pressure of the fluid acting on the backside 94 of the piston 96 drops and is not high enough to overcome the force of the resilient member 368, the piston 96 moves in the second direction causing the plug body 380 to seat against the bottom of the cartridge body 350.

Turning now to FIGS. 18-21, the check valve assembly 56 will be discussed in detail. The check valve assembly includes the check valve body 104, a valve seat 420, the flapper 102 biased against the valve seat 420 by the resilient member 100, and first and second seals, which may be any suitable seal, such as o-rings 422 and 424. The check valve body 104 includes a radially outwardly opening seal groove 426, an inner shoulder 428 against which the valve seat 420 abuts, windows 430 for fluid to flow through, and a spring seat 432 between the windows 430. The radially outwardly opening seal groove 426 receives the o-ring 422 to seal the check valve body 104 to the flow passage 18 while preventing the o-ring from being crushed when tolerances stack up.

When the check valve assembly 56 is assembled, the spring 100 and flapper 102 are inserted into the check valve body 104, and the spring 100 is seated against the spring seat 432 in the body 104 and a spring seat 434 on the flapper 102. The valve seat 420 is then inserted until it abuts the inner shoulder 428 of the check valve body 104. The valve seat 420 is held in position by the flanged top portion 120 of the check valve support 58, and the valve seat 420 is sealed against the check valve body 104 by the seal 424 which is received in a radially outwardly opening seal groove 436 in the valve seat 420. When fluid flows through the flow passage 18, the fluid presses against a backside of the flapper 102 to move the flapper 102 away from the valve seat 420. The fluid then flows through the check valve body 104 and then exits through the windows 430, where the fluid can be expanded by the expansion valve 60.

Turning now to FIGS. 22-26 in addition to FIG. 3, the expansion valve 60 will be described in detail. The expansion valve 60 is received in the valve port 26 between the control valve 54 and the second hand valve 62. The expansion valve 60 includes a bonnet 440 coupled to the valve body 12, a stem assembly 442 movable in the first and second directions relative to the bonnet 440, a packing nut assembly 444 for sealing the stem assembly 442 to the bonnet 440, and a thread cover 446 coupled to the bonnet 440 for protecting the packing nut assembly 444.

The bonnet 440 includes a collar 448, such as a cylindrical body having a passage 450 extending therethrough, and a flange portion 452 having a plurality of openings 454 for receiving suitable fasteners 456 to couple the expansion valve 60 to the valve body 12. The collar 448 includes threads 458 on an outer portion thereof for mating with threads 542 of seal cap 540 (FIG. 28), threads 462 in the passage 450 for mating with threads 464 on the packing nut assembly 444, and threads 466 in the passage 450 for mating with threads 468 on the stem assembly 442. When the collar 448 is coupled to the valve body 12, a suitable seal 470 may be provided to seal the bonnet 440 to the valve body 12.

The packing nut assembly 444 includes a packing nut 480 having the threads 464 for mating with the threads 462 in the passage 450 to secure the packing to the bonnet 440, a gland assembly 482, a stem packing 484, and first and second washers 486 and 488 on either side of the stem packing 484. The first washer 486 is positioned in the passage 450 and abuts a shoulder 490 in the passage 450, the stem packing 484 is positioned above the first washer 486, and the second washer 488 is positioned above the stem packing 486. The gland assembly 482 is provided above the second washer 488 and includes a gland 494 and first and second seals, such as o-rings 494 and 496 provided in respective seal grooves 498 and 500 in the gland 494. The first seal groove 498 is provided in an outer wall of the gland 494 for the o-ring 498 to seal the gland 494 to the passage 450, and the second seal groove 500 is provided in an inner wall of the gland 494 for the o-ring 496 to seal the gland 494 to the stem assembly 442 and the second washer 488. The packing nut 480 is then threaded into the passage 450 until a bottom portion of the packing nut 480 abuts a top portion of the gland 494.

Figure 24:
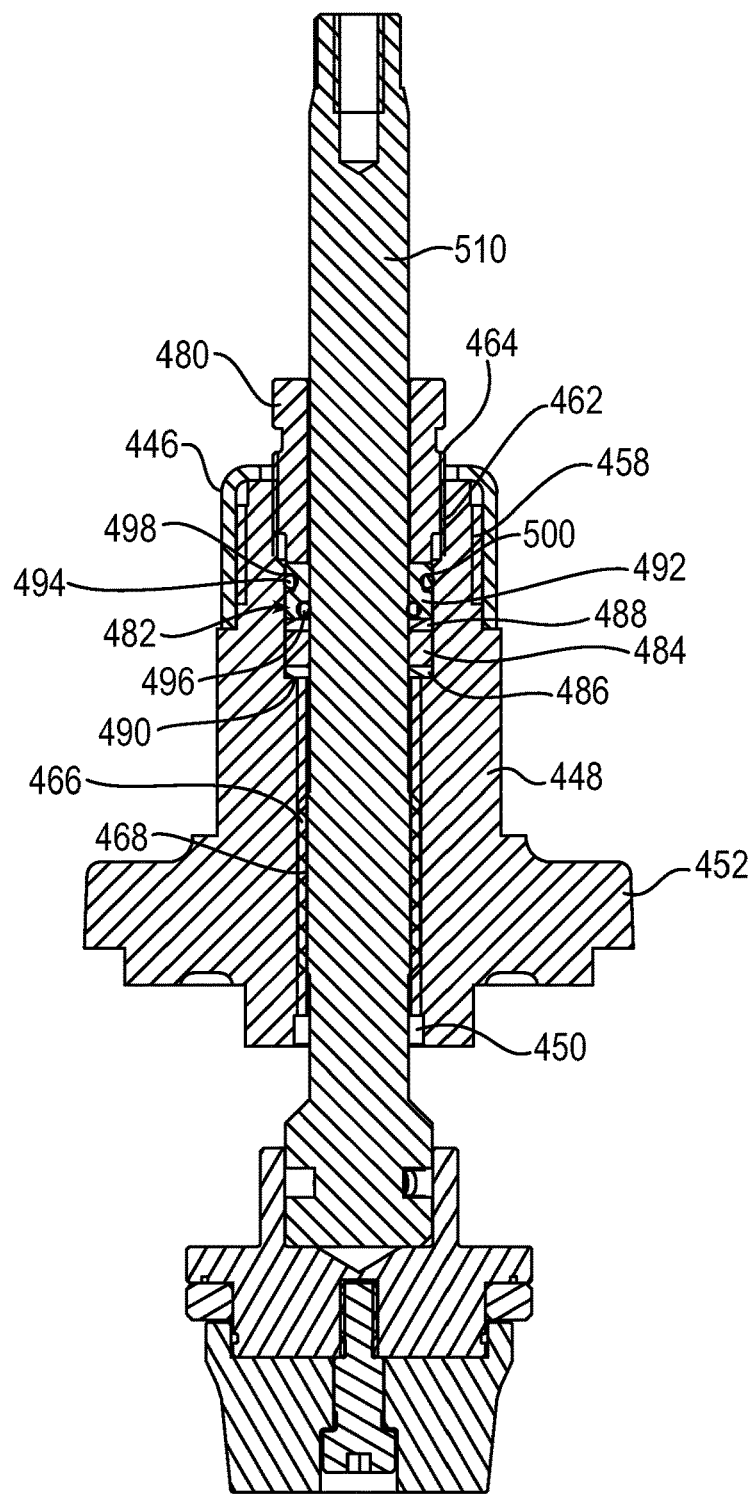
FIG. 24 is a cross-sectional view of the expansion valve taken about line 24-24 in FIG. 23.
Figure 25:
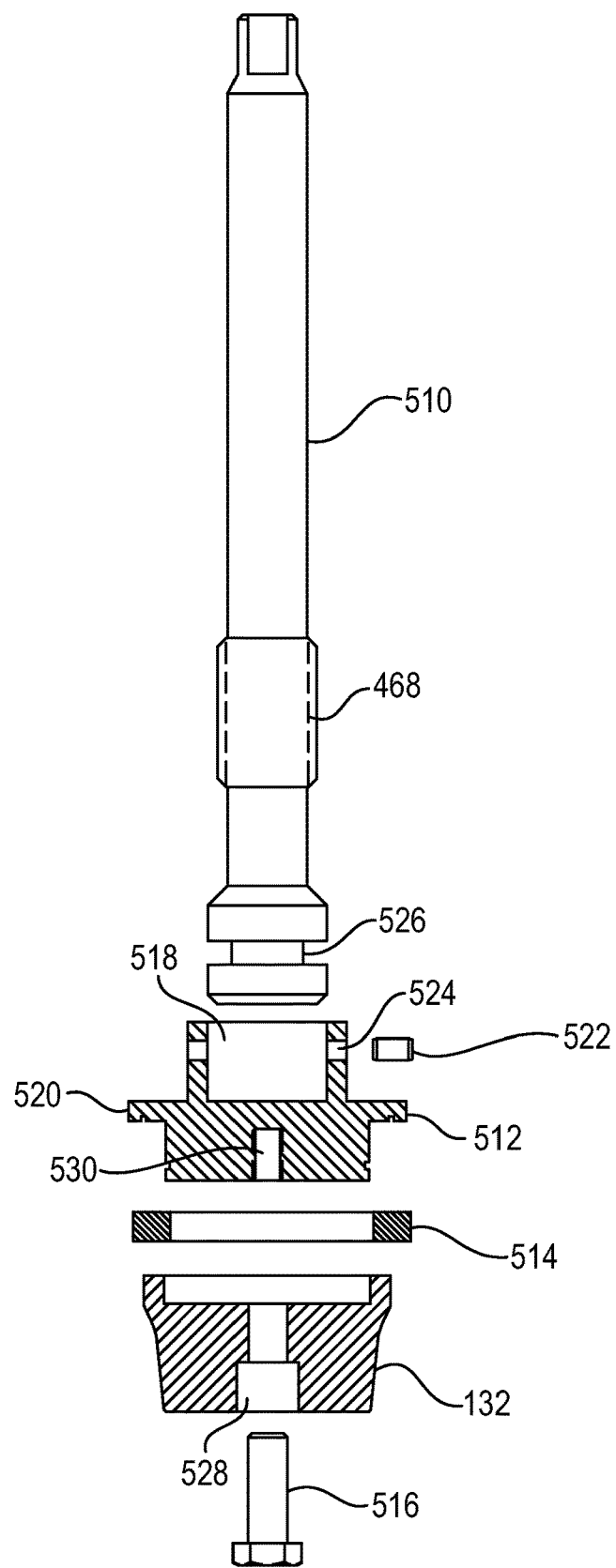
FIG. 25 is an exploded cross-sectional view of an exemplary stem assembly of the expansion valve.
Figure 26:
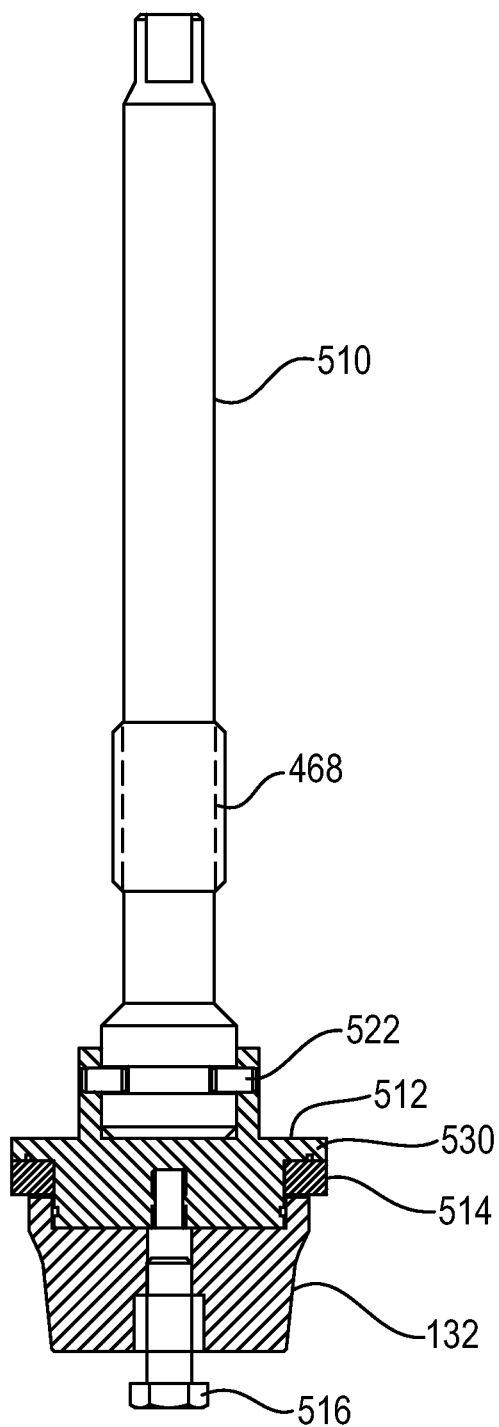
FIG. 26 is another cross-sectional view of the stem assembly.

Referring now to FIGS. 24-26, the stem assembly 442 includes a stem 510 having the threads 468 for mating with the threads 466 in the passage 450, a seat disc 512, a disc carrier 514, the expansion plug 132, and a screw 516. The seat disc 512 includes a cavity 518 for receiving an end of the stem 510, and a flange portion 520. The stem 510 is secured in the cavity 518 by a plurality of spring pins 522 that extend through slots 524 extending through the seat disc 512 into the passage 518 and into an annular groove 526 in the stem 510. The disc carrier 514 abuts a bottom of the flange portion 520, and the expansion plug 132 abuts a bottom of the disc carrier 514. The screw 516 extends through openings 528 and 530 in the expansion plug 132 and seat disc 512 respectively to secure the expansion plug 132 and disc carrier 514 to the seat disc 512.

When the expansion valve 60 is secured to the valve body 12, the stem 510 may be moved in the first and second directions to cause the expansion plug 132 to move to a plurality of positions relative to the valve seat 130 to throttle the fluid flowing through the flow passage 18. The expansion valve 60 is moved by rotating the stem 510, for example by using a respective seal cap 540 (FIG. 27) described in detail below, which causes the threads 468 to move in the threads 466. In this way, an operator may rotate the stems 510 a predetermined number of turns to effect a predetermined throttling of the fluid.

Figure 28:
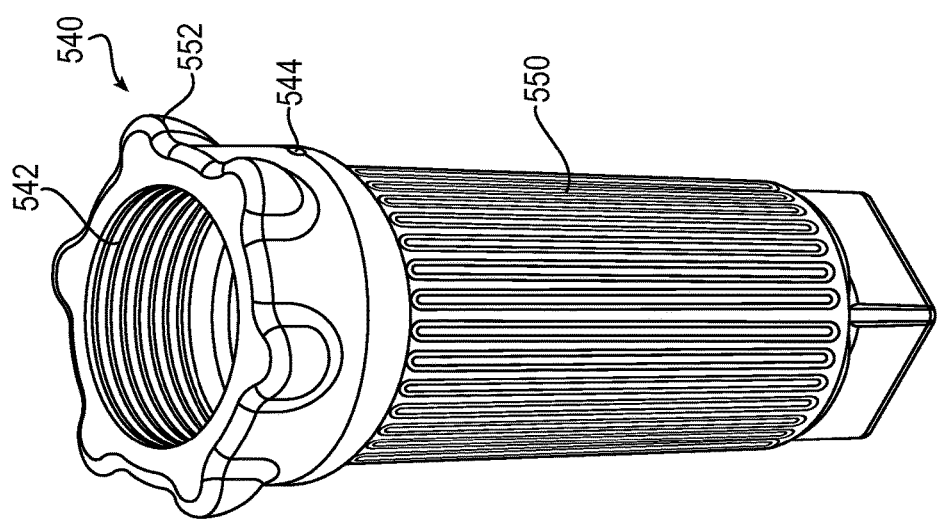
FIG. 28 is another perspective view of the stem cap.
Figure 27:
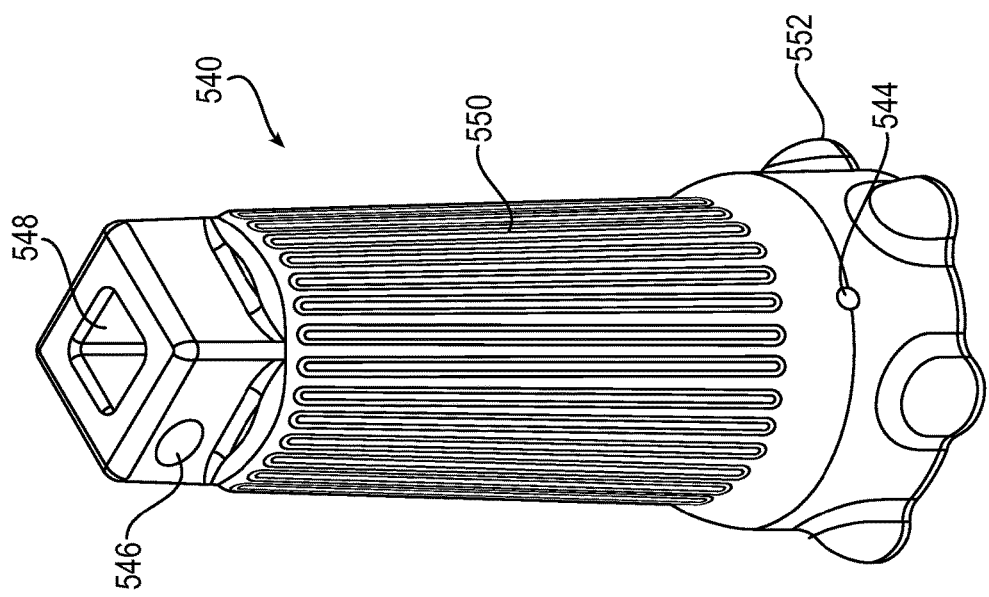
FIG. 27 is a perspective view of an exemplary stem cap.

Turning now to FIGS. 27 and 28, an exemplary seal cap is shown at reference numeral 540. The seal cap 540 is configured to be coupled to at least one of the first hand valve 50, the second hand 62, or the expansion valve 60, such as by threads 542 to prevent leaks from the valves to an environment and to protect the tops of the valves 50, 60, and 62 from particulates. The seal cap 540 includes a vent port 544, a hole 546 for a lockout tagout band, a spanner 548, a first grip 550, and a second grip 552. The vent port 544 allows fluid that has leaked from the respective valve to be vented to the environment when the seal cap 540 is uncoupled from the respective valve, for example when the seal cap 540 is unthreaded from the respective valve. The first grip 550 is provided to assist an operator in unthreading the seal cap 540 from the respective valve.

When the seal cap 540 has been unthreaded from the respective valve, the seal cap 540 may be turned over and the spanner 548, which is shown having a square feature, can mate with the corresponding square feature 544 (FIG. 3) on the valves 50, 60, and 62. The seal cap 540 may then be rotated, for example by gripping the second grip 552, to open or close the respective valve. In this way, an additional tool is not required to open and close the first and second hand valves 50 and 62 or the expansion valve 60.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A refrigeration valve assembly including:
   a valve body having an inlet at a first end, an outlet at a second end, a flow passage defined between the inlet and outlet, and a strengthening rib extending between the inlet and the outlet;
   a flow control valve between the inlet and the outlet; and
   a hand valve between the inlet and the flow control valve for preventing fluid flow from the inlet to the outlet, wherein the strengthening rib has disposed along a length thereof a plurality of ports extending into the flow passage that individually serve as a drain or a test port.

2. The refrigeration valve assembly according to claim 1, wherein the flow control valve is an expansion valve in the flow passage for throttling fluid flowing through the flow passage.

3. The refrigeration valve assembly according to claim 1, wherein the flow control valve is a regulator valve including a plug extending into the flow passage that is movable to regulate the flow of fluid through the flow passage.

4. The refrigeration valve assembly according to claim 1, further including a hand valve between the outlet and the flow control valve for preventing fluid flow from the outlet to the inlet.

5. The refrigeration valve assembly according to claim 4, wherein each hand valve is movable in a first direction for preventing fluid flow through the flow passage.

\* \* \* \* \*